US012802400B2

(12) United States Patent
Nguyen-cao et al.

(10) Patent No.: US 12,802,400 B2
(45) Date of Patent: Nov. 17, 2026

(54) WEARABLE DEVICE FOR CAPTURING USER IMAGE DATA, PROCESSING AND TRANSMITTING COMPRESSED TIMESTAMPED IMAGE DATA TO EXTERNAL DEVICE FOR CLASSIFICATION

(71) Applicant: AUCTIFY, INC., Brampton (CA)

(72) Inventors: Arthur Minh Tri Nguyen-cao, Brampton (CA); Hisham El-Halabi, Brampton (CA)

(73) Assignee: Arthur Minh Tri Nguyen-cao, Brampton (CA)

(*) Notice: Subject to any disclaimer, the term of this patent is extended or adjusted under 35 U.S.C. 154(b) by 271 days.

(21) Appl. No.: 18/574,230

(22) PCT Filed: Jun. 24, 2022

(86) PCT No.: PCT/IB2022/055908
§ 371 (c)(1),
(2) Date: Dec. 26, 2023

(87) PCT Pub. No.: WO2022/269571
PCT Pub. Date: Dec. 29, 2022

(65) Prior Publication Data
US 2024/0303967 A1 Sep. 12, 2024

Related U.S. Application Data

(60) Provisional application No. 63/216,364, filed on Jun. 29, 2021, provisional application No. 63/215,454, filed on Jun. 26, 2021.

(51) Int. Cl.
*G06V 10/764* (2022.01)
*G02B 27/01* (2006.01)
(Continued)

(52) U.S. Cl.
CPC ......... *G06V 10/764* (2022.01); *G02B 27/017* (2013.01); *G06V 10/82* (2022.01);
(Continued)

(58) Field of Classification Search
None
See application file for complete search history.

(56) References Cited

U.S. PATENT DOCUMENTS 7,106,204 B2 9/2006 Pilu et al.
7,543,934 B2 6/2009 Howell et al.
(Continued)

FOREIGN PATENT DOCUMENTS

CN 1209728 C 7/2005
CN 1877340 A 12/2006
(Continued)

OTHER PUBLICATIONS

Hub International [retrieved from internet on Feb. 22, 2024]; <URL: https://www.hubinternational.com/en-CA/blog/2018/06/tracking-workers-with-wearable-technology/; Jun. 8, 2018.
(Continued)

*Primary Examiner* — Haris Sabah
(74) *Attorney, Agent, or Firm* — Williams Mullen; R. Brian Drozd

(57) ABSTRACT

A wearable device includes an image sensor oriented to capture the user's first person perspective; a wireless transmitter; a processor configured to relay the data from the image sensor to an external device that is configured to provide information about the user's daily activities through a graphical user interface; and a software program that processes data from the image sensor and classifies the user's activities. A method of using a wearable device is provided. The method may include collecting image data from a first person perspective of the user; relaying the
(Continued)

image data to an external device that is configured to provide information about the user's daily activities through a graphical user interface; and classifying the user's activities and displaying relevant activity information to the user through the graphical user interface.

10 Claims, 12 Drawing Sheets

(51) Int. Cl.

| | |
|---|---|
| ***G06V 10/82*** | (2022.01) |
| ***G08B 3/10*** | (2006.01) |
| ***G08B 5/22*** | (2006.01) |
| *G06T 7/20* | (2017.01) |
| *G06V 10/141* | (2022.01) |
| *G06V 10/56* | (2022.01) |
| *G06V 10/70* | (2022.01) |

(52) U.S. Cl.

CPC ................. *G08B 3/10* (2013.01); *G08B 5/22* (2013.01); *G02B 2027/0138* (2013.01); *G02B 2027/0178* (2013.01); *G06T 7/20* (2013.01); *G06V 10/141* (2022.01); *G06V 10/56* (2022.01); *G06V 10/70* (2022.01)

(56) References Cited

U.S. PATENT DOCUMENTS

| | | | | |
|---|---|---|---|---|
| 7,580,742 | B2 | 8/2009 | Tan et al. | |
| 7,677,723 | B2 | 3/2010 | Howell et al. | |
| 7,953,824 | B2 | 5/2011 | Rhoads et al. | |
| 9,256,785 | B2 | 2/2016 | Qvarfordt | |
| 9,769,166 | B1 | 9/2017 | Lai et al. | |
| 10,155,114 | B2 | 12/2018 | De Ridder | |
| 10,181,082 | B2 | 1/2019 | Serre et al. | |
| 10,482,334 | B1 | 11/2019 | Chen et al. | |
| 11,147,459 | B2 | 10/2021 | Sobol et al. | |
| 2005/0248718 | A1 | 11/2005 | Howell et al. | |
| 2013/0179110 | A1 | 7/2013 | Lee | |
| 2013/0245396 | A1 | 9/2013 | Berman et al. | |
| 2014/0052567 | A1* | 2/2014 | Bhardwaj .......... | G06Q 30/0631 705/26.7 |
| 2014/0161322 | A1 | 6/2014 | Cheng et al. | |
| 2014/0270707 | A1 | 9/2014 | Fathi et al. | |
| 2015/0324181 | A1 | 11/2015 | Segal | |
| 2016/0007888 | A1 | 1/2016 | Nieminen et al. | |
| 2016/0051168 | A1 | 2/2016 | Kamali et al. | |
| 2016/0125348 | A1 | 5/2016 | Dyer et al. | |
| 2016/0277529 | A1 | 9/2016 | Chen et al. | |
| 2016/0367190 | A1 | 12/2016 | Vaitaitis | |
| 2017/0053553 | A1 | 2/2017 | Jang et al. | |
| 2017/0064260 | A1 | 3/2017 | Wexler et al. | |
| 2017/0075414 | A1 | 3/2017 | Grant et al. | |
| 2017/0188947 | A1 | 7/2017 | Connor | |
| 2017/0220866 | A1* | 8/2017 | Wexler ................... | G06V 20/10 |
| 2018/0081496 | A1 | 3/2018 | Bhardwaj et al. | |
| 2018/0107962 | A1 | 4/2018 | Lundin et al. | |
| 2018/0109767 | A1* | 4/2018 | Li ...................... | G01C 21/1656 |
| 2018/0228403 | A1 | 8/2018 | Li | |
| 2019/0150837 | A1 | 5/2019 | Dibia | |
| 2019/0156219 | A1 | 5/2019 | Dibia | |
| 2019/0318405 | A1* | 10/2019 | Hu .......................... | G06F 16/53 |
| 2020/0170544 | A1 | 6/2020 | Aliverti et al. | |
| 2021/0128062 | A1 | 5/2021 | Karimli et al. | |
| 2023/0328168 | A1 | 10/2023 | Huang et al. | |
| 2023/0368478 | A1 | 11/2023 | Huang et al. | |

FOREIGN PATENT DOCUMENTS

| | | | |
|---|---|---|---|
| CN | 104850846 | A | 8/2015 |
| EP | 3201729 | A1 | 8/2017 |
| EP | 3973448 | | 3/2022 |
| WO | 2014/028765 | A2 | 2/2014 |

OTHER PUBLICATIONS

Daily Commercial News by Construct Connect; [retrieved from internet on Feb. 22, 2024]; <URL: https://canada.constructconnect.com/dcn/news/technology/2020/04/inside-innovation-wearable-devices-require-productivity-and-privacy-balance; Apr. 24, 2020.

The Washington Post; [retrieved from internet on Feb. 22, 2024]; <URL: https://www.washingtonpost.com/technology/2019/06/28/wearable-technology-started-by-tracking-steps-soon-it-may-allow-your-boss-track-your-performance/; Jun. 28, 2019.

K. Maltseva; "Wearables in the workplace: The brave new world of employee engagement;" ScienceDirect; vol. 63; pp. 493-505; 2020.

The Conversation; [retrieved from internet on Feb. 22, 2024]; <URL: https://theconversation.com/bosses-using-tech-to-spy-on-staff-is-becoming-the-norm-so-heres-a-realistic-way-of-handling-it-129734; Jan. 24, 2020.

CNBC; [retrieved from internet on Feb. 22, 2024]; <URL: https://www.cnbc.com/2014/01/22/can-wearable-tech-boost-business-productivity.html; Jan. 23, 2014.

Wired; [retrieved from internet on Feb. 22, 2024]; <URL: https://www.wired.com/story/tech-used-track-employees-name-health/; May 17, 2020.

The Verge; [retrieved from internet on Feb. 22, 2024]; <URL: https://www.theverge.com/2018/12/12/18137961/orcam-myme-ai-facial-recognition-wearable-camera-relationship-tracker-kickstarter; Dec. 12, 2018.

Blueberry X; [retrieved from internet on Feb. 22, 2024]; <URL:https://blueberryx.com/; 2024.

The Verge; [retrieved from internet on Feb. 22, 2024]; <URL: https://www.theverge.com/circuitbreaker/2018/2/22/17037742/vsp-smart-glasses-level-launch; Feb. 22, 2018.

Jie Yin et al.; "Sensor-based Abnormal Human-Activity Detection;" IEEE Transactions On Knowledge and Data Engineering; pp. 1-24; Mar. 24, 2007.

D. Olivieri et al.; "Eigenspace-based fall detection and activity recognition from motion templates and machine learning;" Elsevier; vol. 39; pp. 5935-5945; 2012.

C. Dobbins et al.; "Chapter 2: Lifelogging Technologies to Detect Negative Emotions Associated with Cardiovascular Disease;" ScienceDirect; pp. 27-44; 2016.

A. Cavallaro et al.; "Chapter 5: Audio-visual learning for body-worn cameras;" ScienceDirect; pp. 103-119; 2019.

F. Li et al.; "FMT: A Wearable Camera-Based Object Tracking Memory Aid for Older Adults;" ACM Digital Library; pp; 1-25; Sep. 2019.

Oct. 26, 2022 International Search Report issued in International Patent Application No. PCT/IB2022/055908.

Oct. 26, 2022 Written Opinion issued in International Patent Application No. PCT/IB2022/055908.

* cited by examiner

WEARABLE DEVICE FOR CAPTURING USER IMAGE DATA, PROCESSING AND TRANSMITTING COMPRESSED TIMESTAMPED IMAGE DATA TO EXTERNAL DEVICE FOR CLASSIFICATION

CROSS REFERENCES TO RELATED APPLICATIONS

The present application claims the benefit of priority to U.S. Provisional Patent App. No. 63/216,364 which is filed on Jun. 29, 2021 and U.S. Provisional Patent App. No. 63/215,454 which is filed on Jun. 26, 2021 which are hereby incorporated by reference in their entireties.

BACKGROUND

1. Field

The present invention relates to systems and methods of detecting general, everyday activities using a wearable device with an image sensor that captures image or video data from a first person perspective.

2. Brief Description of Prior Art

There are several factors that make general activity tracking challenging. The main challenge is the significant number of diverse and similar activities that individuals engage in. This becomes even more difficult when considering the number of activities that users can partake in with little movement, such as using their phone, computer, watching TV, reading, and others. The similarity of such activities makes it difficult to differentiate between them.

Hence, the systems required to extract sufficient data from the user and their environment in order to automatically classify their activities is non-trivial. Brain sensing devices, such as electroencephalography can be used to detect focus, but erroneous readings and interference from other human systems can make such a system less accurate. Furthermore, only an ambiguous state of mind can actually be deduced from these readings, due to the lack of spatial resolution that most wearable brain sensing devices can offer. It is thus infeasible to use transcutaneous brain sensing to accurately distinguish between different human activities. Heart rate can also be correlated to the user's state of mind, but the accuracy of such a system may break down when the user is engaged in strenuous physical activity. Furthermore, this correlation is also subject to the same problems that transcutaneous brain sensing would be subject to, in that the information obtained from these sensors is not enough to accurately distinguish between different user activities. While motion sensors can be used to differentiate between certain activities, these are primarily limited to activities that involve specific movement patterns. Precise activity tracking becomes challenging with motion sensors when the movement patterns of different activities are very similar, or when activities involve little to no movement at all. To distinguish between the vast number of potential activities that a user may be engaged in, information must be extracted from both the user as well as their surroundings.

Thus, there is a need for a wearable system that can extract information from the user and their surroundings in order to automatically classify their activities and behaviors. This is a challenge, as such a system must be able to extract enough information from the user and their surroundings such that it can accurately distinguish between everyday human activities. Such a system must also be designed so that the user can wear it comfortably throughout the day in order to receive accurate insights about their everyday activities. Designing such a system that can seamlessly integrate into the user's everyday routine is non-trivial, especially considering the complexity of the sensors and hardware systems required to realize such an invention.

SUMMARY

According to some embodiments, the above problems are solved using a system and method of tracking activities and providing feedback to improve productivity through a wearable device. Such a wearable device would utilize a CPU or processor, an image sensor, and/or a wireless transmitter to collect image data from the first person perspective of the user, and then relay that information to a software application on an external device. Through this software application, the user can track their daily activities through a graphical user interface. They may also specify which activities they want to prioritize, in which case the wearable device will provide feedback to the user to stay focused and mitigate lower priority activities. The wearable device may also provide real time cues to the user through light or sound, and may additionally send notifications to the user's mobile phone or other computing devices in order to promote mindfulness, improve motivation, and help the user stay productive.

According to one aspect, a\wearable device includes an image sensor oriented to capture the user's first person perspective; a wireless transmitter; a processor configured to relay the data from the image sensor to an external device that is configured to provide information about the user's daily activities through a graphical user interface; and a software program that processes data from the image sensor and classifies the user's activities.

According to another aspect, a method of using a wearable device is provided. The method may include collecting image data from a first person perspective of the user; relaying the image data to an external device that is configured to provide information about the user's daily activities through a graphical user interface; and classifying the user's activities and displaying relevant activity information to the user through the graphical user interface

DETAILED DESCRIPTION

Figure 1:
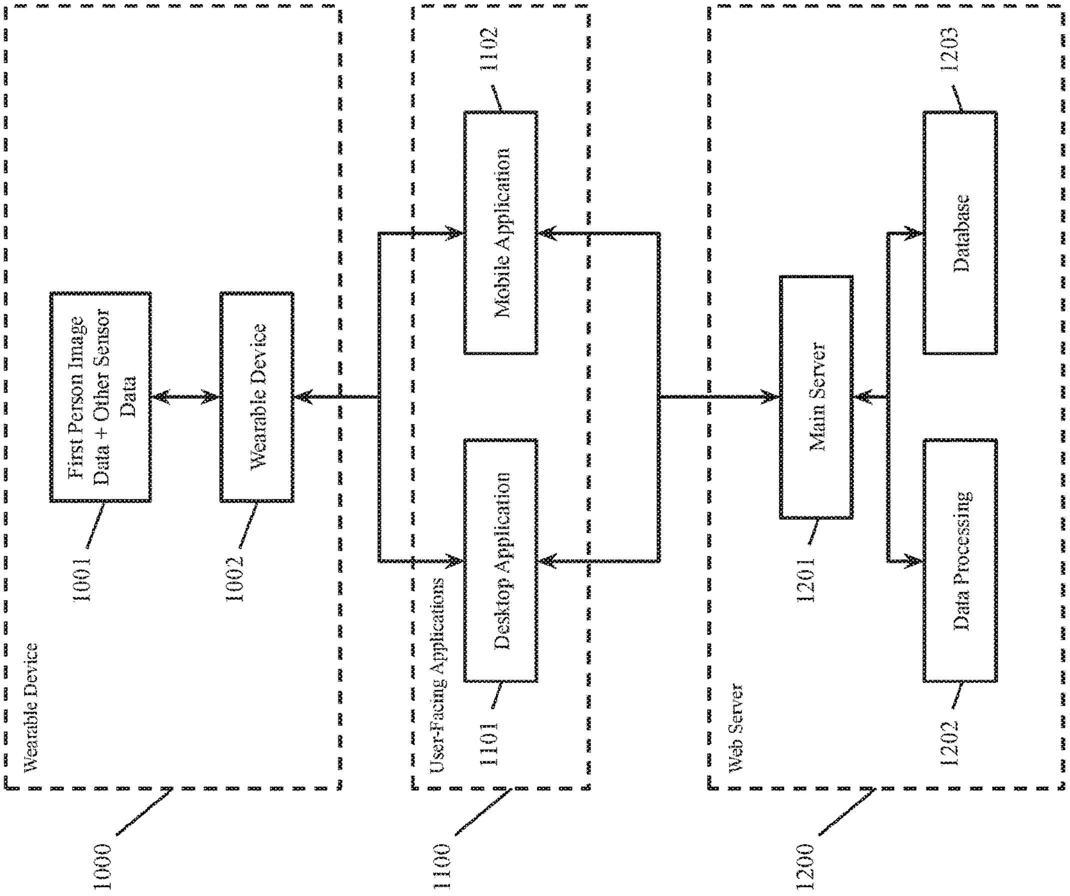
FIG. 1 depicts an overall configuration of the system according to some embodiments of the present disclosure where a server is used to process information from the user's environment.

As mentioned above, embodiments of the present disclosure provide a means of tracking general activities through a wearable hardware device. Such general activities refers to any activity that the user may engage in throughout the day, and includes both common everyday activities (ie. eating, watching TV, socializing, exercising), as well as any activities or programs that the user might engage in on a computer or mobile device (ie. such as social media, streaming, or word processing). Such a system requires two main objects according to some embodiments (but may not be required in all limitations): first, a wearable device that can capture data from the user and their surroundings, and second, an activity classification program that infer the user's activities based on the sample data. These objects are summarized below:

The first object of invention involves the use of a wearable device which has the means to capture and transmit image data to a server or external hardware, or process said image data on the wearable device itself. Such a device would be equipped with an onboard or portable power source, as well as one or more processors which may interface with an image sensor and a wireless transmitter. The main processor, or CPU of such a device can be realized by several potential architectures, including but not limited to single or multi-core microprocessors, microcontrollers, or other embedded systems. In the case of a microprocessor, such a device would typically be equipped with peripherals such as ROM (Read Only Memory), RAM (Random Access Memory), as well some form of Non-Volatile Memory (such as a hard drive, solid state drive, flash memory, or others). In the case of a microcontroller, such a device may be similarly equipped with peripherals such as ROM, RAM, and Non-Volatile memory, but these are not always required as most microcontrollers have integrated flash memory and integrated RAM already built in. The main processor would execute a Main Application which would carry out all of the required logic and processing to complete its tasks. Such an application could be realized by a simple state machine or an operating system. The main purpose of the application is to continuously sample image data, and relay the data to the activity classification program, as well as respond to any other onboard I/O. For the purposes of the present disclosure, image data refers to any information captured by an image sensor or equivalent device, and may refer to either singular images sampled statically, or a series of images captured over a period of time (ie. a video). The image sensor mounted or embedded in the wearable device would provide the most information regarding the user's activities, as it would capture images from a first person point of view, and would approximate what the user is seeing with their own eyes. In addition to an image sensor, the device may also employ a multitude of other sensors to capture information about the user or their surroundings. Such sensors may include, but are not limited to, IMU (Inertial Measurement Unit) sensors, HR (Heart Rate) sensors, temperature sensors, microphones, brain sensing devices, GPS devices, and eye-tracking sensors. IMU and HR sensors can help to provide further insight into the user's activities as movement and heart rate data may have a correlation with certain general activities. Furthermore, IMU and HR sensors can also be used to quickly deduce whether or not the user is engaged in strenuous physical activity, especially when the user's current activity is not immediately clear from the image data of the user's environment. For instance, it would be difficult to deduce the difference between going for a walk and going for a run outside using image data alone. Other I/O devices may also be integrated into the wearable device to allow the user to interact with it directly. A tactile sensor may be used to send certain instructions or trigger the execution of certain programs on the CPU. Such a tactile sensor may be embodied by a capacitive touch sensor, a physical button, a switch, or any equivalents. An LED or heads up display may also be used to provide relevant information to the user. One or more sound emitters and microphones may also be embedded into the device, to provide yet another method of interacting with the wearable device directly. Such elements may also be used to allow the wearable device to function as a wired or wireless headset or audio player. A wired connection interface may also be used to allow the user to connect directly to the wearable device, to facilitate charging, programming, or data transfer. Lastly, a wireless transmitter mounted on or embedded within the device may be used to transmit the image data and any other relevant data to an external hardware device or external server. Examples of such a transmitter include any RF (Radiofrequency) modules, and may employ standard communication protocols including but not limited to Bluetooth, Wifi, 3G, 4G, or LTE. A wireless transmitter is not required if the activity classification program is run onboard the wearable device, but exemplary embodiments of this invention would involve offloading this processing to external hardware or an external server to minimize the amount of computing resources required in the wearable device, while maximizing the accuracy of the activity classification program and the variety of activities the program can classify.

The second object of invention involves a computer program that can extract key elements from the captured first person image data and infer the user's activity at any given time. This object will be hereinafter referred to as the Activity Classification Program. At a minimum, the activity classification program requires image data as an input in order to accurately deduce the user's activities. However, the activity classification program may use additional inputs, including, but not limited to, IMU and HR data to supplement the foregoing image data. Such a program may employ any image recognition heuristic to directly correlate the image data with the user's general activities. At a minimum, a simple convolutional neural network, support vector machine, or other machine learning heuristic may be trained to classify the user's activities based on the first person image data by itself. However, in exemplary embodiments of the present invention, one or more of these heuristics are employed alongside logical computer operations to classify the user's activities at any given time with a high degree of accuracy and precision, without requiring an inordinate amount of training data or computing resources. One or more layers of abstraction may be used to efficiently extract and compute the most relevant features from the user and the user's environment before passing these features into a final classification program, which may employ both logic and machine learning heuristics to infer the user's activities. For instance, an object detection model may be used to extract relevant objects from the image data, and the detected objects would then be passed into another subprogram that uses logic and machine learning heuristics to infer the user's activities. If a computer or mobile phone screen is detected during this process, the screen may be additionally extracted, whereby a series of further preprocessing and classification operations are performed to infer what specific computer or phone activity (ie. streaming, social media, word processing, or others) the user is engaged in at any given time. A separate model may also classify the user's current location and environment based on the image data, which would serve as an additional input into the final classifier which infers the user's activities.

One such exemplary embodiment of the foregoing wearable device embeds an image sensor, a processor, RAM, non-volatile memory, and a wireless transmitter into a pair of glasses. Additionally, an IMU and HR sensor are also embedded into the glasses as additional input devices, and a touch sensor and multicolor LED is used to allow the user to interface directly with the wearable device. The glasses may also be fitted with prescription, blue-light blocking, or tinted lenses as the wearable device is intended to be a natural looking accessory item that the user can seamlessly integrate into their everyday routine. Such an embodiment would also provide optimal positional for the image sensor, as it would be mounted at approximately eye-level, and could capture approximately what the user is seeing from a first person point of view. In such an embodiment, image, IMU, and HR data is sampled continuously throughout the day, stored in the onboard non-volatile memory, and made available to wirelessly transmit to the user's mobile phone or computer upon connecting to the user-facing companion application. Upon receiving the data samples transmitted by the wearable device, the user-facing companion application would then either process the data locally or offload the processing to an external server, where the user's current activity would be inferred using the activity classification program. In some cases, it may be beneficial to display the user's current level of productivity to them directly on the glasses, by use of the multicolor LED. The user's current level of productivity can be inferred based on the current classified activity, as well as the user's pre-existing goals and preferences which they would have set in the companion application upon initial setup. One or more sound emitters may also be embedded into the glasses, wherein the sound emitters could provide audible cues to the user to notify them of changes in their productivity. One or more microphones and/or tactile sensors may also be used as input devices to allow the user to interact with their glasses directly. Taken together, the combination of a microphone, sound emitter, tactile sensor, and wireless transmitter would also allow the wearable device to function as an audio device or headset.

In exemplary embodiments of the present invention, a BLE (Bluetooth Low Energy) module is used as the wireless transmitter embedded within the wearable device. While other RF modules (ie. Wifi, LTE) may be used to transmit image and other data captured by the wearable device, BLE typically exhibits the lowest energy consumption, and as such the wearable device would require a smaller battery to attain a reasonable battery life. A microcontroller may also be used in lieu of a microprocessor to further decrease the energy consumption required by the wearable device and extend the overall battery life.

In exemplary embodiments of the present invention, first person image data, IMU data, and HR data are used as inputs into the activity classification program. Stored user data may also be used as an additional input into the activity classification program. Such a program would first determine, based on previous IMU data, if the wearable device is currently being worn or not before attempting to classify the activity. If the wearable device was not worn at the time of data sampling, the data would be discarded in order to save computational resources, in addition to avoiding the possibility of outputting an erroneous result. In contrast, if the data sample was deemed to be a valid data sample, then the data would then be preprocessed to extract the image, as well as calculating the user's approximate caloric burn based on the IMU and HR data. The extracted image would then be passed into both a pretrained environment classifier and an object detection model. The environment classifier would then output the user's inferred environment and/or location (ie. grocery store, office, restaurant, or others), which would serve as a direct input into the final classification program. The object detection model would also extract all relevant objects and their respective box coordinates from the user's first person image data, which would also be passed as inputs into the final classification program. If one or more computers or mobile devices are detected as objects in the user's surroundings, the image could then be passed through an additional preprocessing program which would crop out the computer or mobile device screen through edge detection and image distortion. The cropped screen image would then be passed through two additional models, one which attempts to extract any recognizable logos or layouts that are characteristic of common applications or websites, and the other which attempts to extract any recognizable texts using an OCR (optical character recognition) model. The results of these two models are then amalgamated through an additional screen activity classification program, which may employ either machine learning heuristics, computer logic, or both to determine the current activity taking place on the user's screen(s). Alternatively, a web browser extension or application installed on the user's computer or mobile device may be used to track screen data instead of requiring further imaging process as previously described. The resulting screen activity is then used as yet another input which is passed into the final classification program, which would then output the user's current most likely general and screen (if applicable) activity. The complete activity classification program could thus output the user's inferred location (if applicable), general activity, screen activity (if applicable), as well as the user's estimated caloric burn (if applicable), which could be used by the companion application to display relevant past and current activity information to the user.

The unique combination of both an activity classification program and a wearable device that can capture image data from a first person point of view allows the user to track general, everyday activities to a high degree of precision that has never been done before. In exemplary embodiments, the user can connect to the wearable device by means of a user-facing desktop or mobile companion application, where they would be able to synchronize the data samples collected by the wearable device, and see an overview of how they spent their time throughout the day. To better help the user understand and assess their level of productivity throughout the day, the user can also input their own goals and targets into this companion application, as well as specify which activities they consider to be of a productive, neutral, or unproductive nature. Such a companion application would not only provide relevant metrics about the user's activities throughout the day, but could also provide insights and recommendations to the user on how to better optimize their time in the future.

FIG. 1 is a diagram illustrating one potential embodiment of the present invention. In such an embodiment, the bulk of the data processing is offloaded to an external server which runs an activity classification program 1202. In such an embodiment, an external server is used to process data as it would typically have less resource constraints than if the activity classification program 1202 were to be run locally on the user-facing companion application 1100 or the wearable device 1000 itself. Such an embodiment comprises the wearable device 1000, one or more user-facing applications 1100, and one or more web servers 1200.

In exemplary embodiments of the present invention, first person image and other sensor data 1001 is continuously captured by the wearable device 1000. Image data is captured by an onboard camera module 3005 containing an image sensor 6010, which is then transferred to the onboard CPU 6003 or 6104. The interface between the image sensor 6010 and the CPU may be any data transfer interface, which includes, but is not limited to serial and parallel data transfer interfaces such as MIPI-CSI (MIPI Camera Serial Interface) and DVP (Digital Video Port). Other onboard sensors, such as an IMU 6011 and a HR sensor 6012 may also be used to capture information about the user and their surroundings, to further improve the accuracy of the activity tracking program. The CPU 6003 or 6104 may interface with these sensors through any data transfer interface, which includes, but is not limited to I2C (Inter-Integrated Circuit), SPI (Serial Peripheral Interface), and UART (Universal Asynchronous Receiver Transmitter). The wearable device 1000 would also be equipped with an onboard clock or RTC (Real Time Clock), which allows it to timestamp each of the data samples. The CPU 6003 or 6104 may then store each data sample along with its respective timestamp in RAM or non-volatile memory. The data samples along with their respective timestamps would then be sent from the CPU to an onboard BLE (Bluetooth Low Energy) transmitter 6009, where the data would be transmitted wirelessly to a user-facing application 1100 on the user's computer, laptop, or mobile device. The application 1100 then sends this data to the web server 1200 via a TCP (Transmission Control Protocol) connection. While a REST API (Representational State Transfer Application Programming Interface) request would be the simplest method of uploading this data, other equivalent methods, (for instance, WebSockets) may be used to achieve the same effect. Once the request is received by the web server 1200, the data is processed via 1202, and stored in one or more databases 1203. Based on the image and other sensor data received by the server, various heuristics in 1202 attempts to classify the user's activities and other relevant information (such as caloric burn, steps walked, distance traveled, stress level, mental state, etc.). This information may then be stored in one or more databases 1203, and sent back to the user-facing application via a REST API response or other data transfer method. As the wearable device 1000 is continuously capturing image and other data samples throughout the day, both the user-facing application 1100 and the web server 1200 are intermittently updated with new data. As such, the user can view their recent activities and metrics any time they open the user-facing application 1100. If necessary, the user may also initiate a manual refresh of the user-facing application, which would cause the application 1100 to immediately attempt a new data transfer from the wearable device 1000.

In some embodiments of the present disclosure, a screen tracking software or web browser extension installed on the user's computer or mobile device may be used to track screen activity, and either supplement or replace the predictions of the activity classification program 1202.

In some embodiments of the present invention, only an image sensor 6010 is used to capture relevant data 1001 relating to the user and their surroundings. In such an embodiment, other sensors such as an IMU 6011 and a HR sensor 6012 are not necessary, as first person image data is enough to accurately classify the user's activities in most cases.

In some embodiments of the present invention, a method of eye-tracking is used in addition to the image sensor 6010 capturing first person image data. Eye-tracking may be implemented by means of Infrared Oculography (IOG), Electro Oculography (EOG), Video Oculography (VOG), or others. In the case of IOG, one or more thermal imaging cameras would be integrated into the wearable device 1000 as additional inputs, and mounted such that they can capture images of one or both of the user's eyes. In the case of EOG, one or more electrodes mounted near the user's eyes would be integrated into the wearable device 1000, and the signal from these electrodes would then be amplified using an ADC (Analog-Digital Converter). The resultant digital signal would then be used as an additional input from which the user's eye position and orientation could be estimated. Alternatively, one or more image sensors onboard the wearable device 1000 may be used to capture video or images of one or both of the user's eyes, from which the user's eye position and orientation could be estimated through any eye-tracking heuristics. The user's eye position could then be mapped to a point on the first-person image data. The advantage of collecting both first-person image data and eye-position data is that the present invention would be able to deduce exactly what the user is looking at, which may improve activity classification accuracy in situations where the user is multitasking, or the image data is cluttered with objects that are not relevant to the user's current activity.

In some embodiments of the present invention, alternative methods of wireless transmission may be used between the wearable device 1000 and the user-facing application 1100. While BLE typically exhibits a lower power consumption than other types of wireless transmission protocols, any other wireless transmission method may be used to achieve the same effect. Other methods that may be used include, but are not limited to Bluetooth Classic, Wifi, LTE, or any other RF transmission method.

In some embodiments of the present invention, a wired connection is used to transfer data between the wearable device 1000 and the user-facing application 1100. While this is less convenient for the user, it may be preferable in certain situations requiring a faster data transfer rate.

In some embodiments of the present invention, alternative internet protocols may be used between the user-facing application 1100 and the web server 1200. While a TCP connection is the simplest and most universal method of connecting a client application with a web server, any other internet protocol may be used to achieve the same effect. For instance, UDP (User Datagram Protocol) may be used instead of TCP to transfer data to and from the web server 1200.

In some embodiments of the present invention, both the user-facing application 1100 and the web server 1200 are updated immediately, instead of intermittently, as soon as the sample data becomes available on the wearable device 1000. To achieve this, the wearable device 1000 must be persistently connected to the user-facing application 1100 via either a wired or wireless connection. Additionally, a real time data transfer method, such as WebSockets, may be used between the user-facing application 1100 and the web server 1200.

Figure 2:
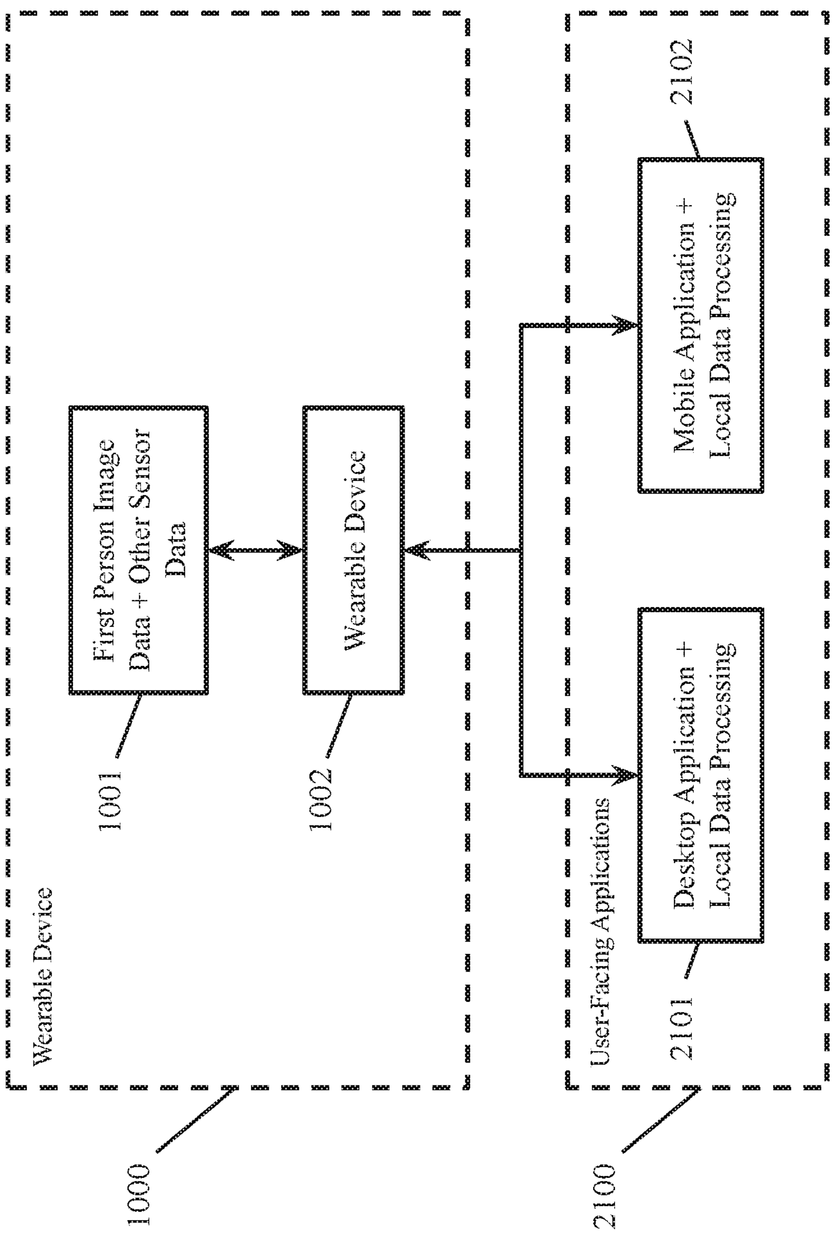
FIG. 2 depicts an overall configuration of the system according to some embodiments of the present disclosure where no server is required to store or process information from the user's environment.

In some embodiments of the present disclosure, the web server 1200 is not used, as outlined by FIG. 2. In such an embodiment, the bulk of the data processing is offloaded to a user-facing companion application 2100, which would host the activity classification model and other data processing models locally. In this configuration, the user would still be able to utilize the functions provided by the present invention even when not connected to the internet. Typically, data processing on a local computer or mobile device is subject to more resource constraints than a dedicated web server, and as a result, the user-facing companion application may utilize a condensed version of the activity classification program 1202.

In some embodiments of the present disclosure, the wearable device integrates a built-in heads up display or AR (Augmented Reality) display to provide relevant information to the user. Such a device may employ an LCD (Liquid Crystal Display), LCOS (Liquid Crystal on Silicon), OLED (Organic Light Emitting Diode), or other panel to display information or interface with the user. A backlight may also be integrated as necessary. The display panel would be controlled by the CPU 6003 or 6104. In such an embodiment, a prism, waveguide display, or other projection technology may be used to project the image or video presented by the display panel onto the user's field of view.

In some embodiments of the present disclosure, a web server 1200 is used, but a user-facing application 1100 is not required. In such embodiments, the wearable device 1000 must be able to connect to the internet directly, either by means of Wifi or a mobile broadband connection. As such, the wearable device 1000 would use either a Wifi module, LTE module, 3G module, or other mobile broadband module in place or in addition to a Bluetooth module to wirelessly transmit data directly to the web server. While such an embodiment may be advantageous in terms of portability, the necessary use of Wifi or long range cellular data transmission may reduce the battery life of the wearable device.

In some embodiments of the present disclosure, neither a web server 1200 or a user-facing application 1100 is required. In such embodiments, the wearable device 1000 must be able to perform all of the data processing tasks locally, without assistance from external devices or servers. Therefore, the entire activity classification program 1202 must be stored and run on the wearable device 1000 itself. One or more CPUs may be used to carry out this task, and the activity classification program 1202 would have to be condensed in order for data processing to be completed in a timely manner with limited computing resources. Such a device may have to employ a microprocessor 6104 as the CPU, rather than a low power microcontroller 6003. One or more GPUs (graphical processing unit) or GPU microprocessors may be used to supplement or replace the onboard CPU(s). Additionally, increased RAM and non-volatile storage may also be required to support data processing. At least 2 GB of RAM (either internal or external) and 8 GB of non-volatile storage is recommended to run all necessary data processing tasks, although other values may be used. In such embodiments, an LED, a heads up display, or audio device may also need to be integrated into the wearable device to provide the user with relevant activity information. One or more tactile sensors may also be integrated into the wearable device to provide a means by which the user can directly interact and/or control the device. Alternatively, head motion recognition, gesture recognition, speech recognition, eye-tracking, or other methods may be used to allow the user to directly interact and/or control the device through. While the foregoing embodiment may be advantageous in terms of portability, the increased computational load and thus the increased hardware requirements may both reduce the overall battery life and increase the overall volume of the wearable device illustrated in FIG. 3.

In some embodiments of the present disclosure, a wearable device 1000 is not required, and the necessary functions of the device 1000 are instead implemented on the user-facing application 1100. For instance, the user may take photos or videos of their activities periodically throughout the day, and these medias would be transferred to the user-facing application 1100 for processing and logging.

In some embodiments of the present disclosure, the user-facing application 1100 may utilize and import data from other third party wearable devices not described by the present invention, including but not limited to smart watches, smart rings, audio devices, or other wearables or IOT (internet of things) devices. Data from these devices may be additionally displayed in the user-facing application to provide additional functionality to the user (such as fitness or health tracking). In some embodiments of the present disclosure, data from these external devices may even be used as additional inputs into the activity classification program 1202 to further improve classification accuracy. For instance, IMU data from a smart watch may aid in activity recognition to help differentiate between different forms of exercise (ie. running, walking, weightlifting, or others).

Figure 3:
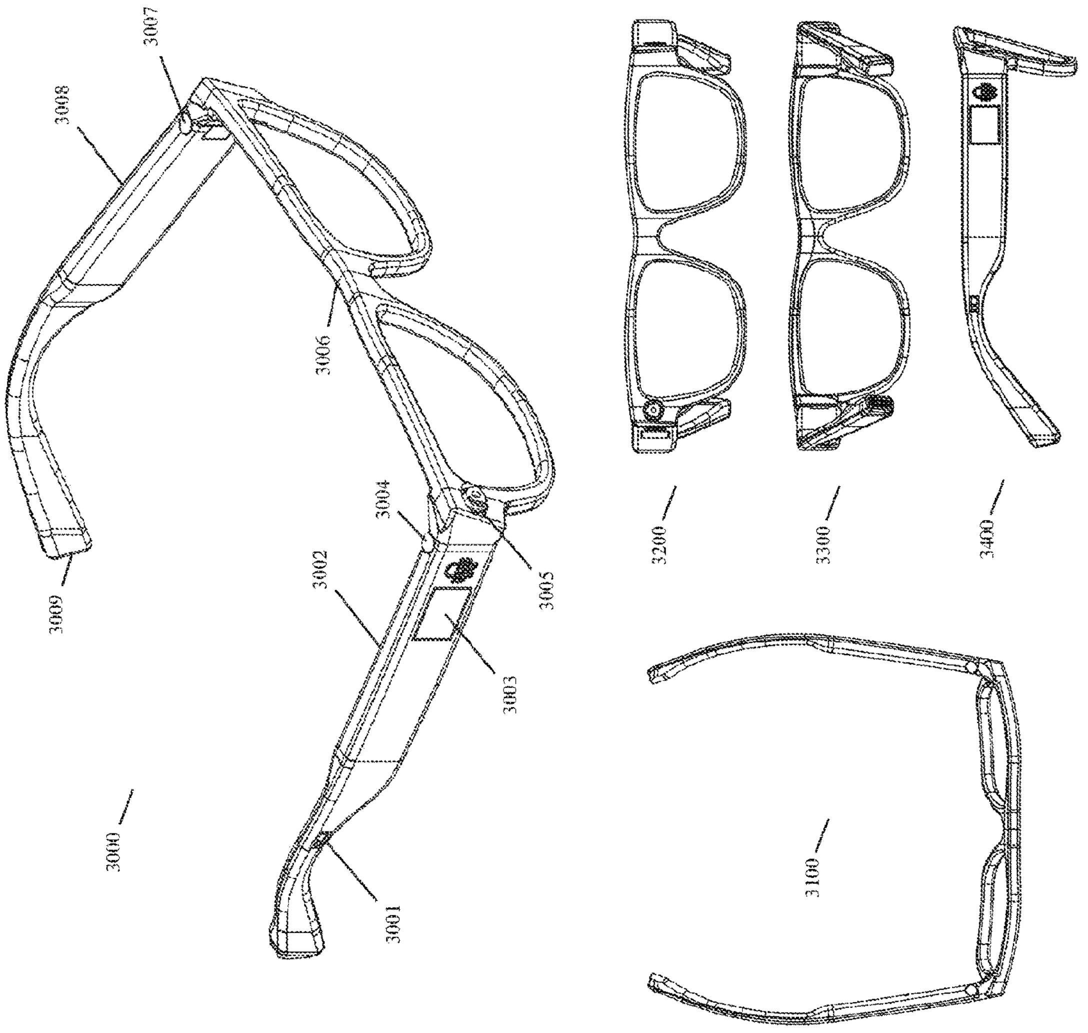
FIG. 3 depicts one possible configuration of the physical wearable device.

In exemplary embodiments of the present disclosure, the wearable device 1000 is realized as a pair of eyeglasses. Diagrams 3000, 3100, 3200, 3300, and 3400 in FIG. 3 illustrate one potential design of such an embodiment. Diagrams 7000, 7100, and 7200 in FIG. 7 further illustrate this design by showing the layout of the circuitry and mechanical components that comprise the wearable device 1000. While the wearable device may be embodied by other forms, eyeglasses are a preferred form as they are aesthetically similar to everyday apparel, and can also provide vision correction to the user. Diagram 3000 provides an isometric view of such an embodiment, and diagrams 3100, 3200, 3300, and 3400 provide a top view, front view, rear view, and right side view of this preferred embodiment respectively. In such an embodiment, the device 1000 comprises three main components, the right arm/temple 3002, the frame front 3006, and the left arm/temple 3008. Visible components that can be seen in the right temple 3002 are the PPG (Photoplethysmography) sensor 3001, the capacitive touch sensor 3003, and the hinge pin 3004 which is the primary structural link between the right temple 3002 and the frame front 3006. The camera module 3005 can be seen to be embedded on the right side of the frame front, in order to maintain a close proximity to the main circuit board 7004. Visible components that can be seen in the left temple 3008 are micro USB port 3009, and the hinge pin 3007 which is the primary structural link between the left temple 3008 and the frame front 3006. Diagrams 7000, 7100, and 7200 further provide the isometric breakdown view, top breakdown view, and rear perspective breakdown view of the preferred mechanical embodiment and the internal circuitry layout. The right temple 3002 can be seen to be broken down into two main structural components, the temple face 7003 and the temple main housing 7002, which together enclose the PPG sensor 3001, the right sound transducer 7001, the main circuit board 7004, as well as cables and other interfaces not shown in the diagram. A small gap in the right temple face 7003 allows for the touch sensor 3003 to slot into the right temple face. The hinge pin 3004 can be seen to slot first into the top joint in the right temple main housing 7002, then into the hinge joint on the right side of the frame front housing 7006, then finally into the bottom joint in the right temple main housing 7002, creating a sturdy structural link between the right temple 3002 and the frame front 3006. The frame front 3006 can be seen to be broken down into two main structural components, the frame front housing 7006 and the frame front face 7007, which together enclose the camera module 3005 as well as cables and other interfaces not shown in the diagram. The right and left lenses 7005 and 7008 respectively slot into the frame front 3006. Similar to the right side assembly, the left side hinge pin 3007 slots through the joints in the left temple main housing 7010 as well as the joint in the frame front housing 7006, creating a structural link between the left temple 3008 and the frame front 3006. Similar to the right temple 3002, the left temple 3008 can also be broken down into the left temple main housing 7010 and the left temple face 7011, which together enclose the battery 7009, the power/charging circuit 7012, the left sound transducer 7013, the micro USB port 3009, as well as cables and other interfaces not shown in the diagram. When assembled, the main structural components of the glasses frames 7002, 7003, 7006, 7007, 7010, and 7011 may be affixed to one another by any means, which include but are not limited to snap fits, pin hole assemblies, rivets, screws, plastic welding, adhesives, or tape. However, through experimentation, it has been found that a simple method of attaching these components involves the use of snap fits or pin hole assemblies in combination with either plastic welding or adhesives. Specifically, snap fits or pin hole assemblies are used to first affix the left and right temple faces 7011 and 7003 to the left and right temple main housings 7010 and 7002. These elements can be seen protruding from the temple faces in diagrams 7100 and 7200. In addition, the snap fits or pin hole assemblies are also used to affix the frame front housing 7006 and the frame front face 7007, as outlined in diagrams 7100 and 7200. The snap fits/pin hole assemblies provide initial structural support for the device 1000, and once fully assembled, either plastic welding or adhesives should be used to seal the gaps between the temple housings 7002 and 7010 and temple faces 7003 and 7011, as well as the gaps between the frame front housing 7006 and the frame front face 7007. The main structural components of the glasses frames 7002, 7003, 7006, 7007, 7010, and 7011 may be composed of any material, which include but are not limited to fiberglass, fiberglass resin, carbon fiber, plastics, and/or metals. Furthermore, these structural components need not be composed of the same material. However, in order to minimize the weight of the wearable device 1000, either plastic (such as cellulose acetate or polycarbonate) or carbon fiber is preferred.

The foregoing exemplary embodiment is further described by the following preferred specifications. The camera module 3005 should support color images with at least 720p, with a desirable resolution being 1080×720 or higher in order for the activity classification program 1202 to accurately and consistently classify both general and screen activities. However, there may be situations where a lower resolution is needed, as it may be desirable to capture and transmit image data at a higher sampling rate (for instance, 30 FPS video capture). Through experimentation, it has been deduced that resolutions even as low as 240×320 are sufficient to produce accurate general activity tracking, although screen activity classification may not hold up to the same standard of accuracy. It can thus be asserted that resolutions lower than 240p may also be used, although the accuracy and consistency of activity classifications may be impacted. Such a situation where these low resolutions could be employed would be where a screen tracking application or browser extension runs in the background on the user's computer or mobile device, in conjunction with the wearable device 1000, thus enabling accurate screen activity tracking without relying on extracting screen information from the captured first person image data. It is also recommended that the camera module 3005 is equipped with a wide angle fisheye lens, with a FOV (Field of View) of 120 degrees or higher. While a fisheye lens is not required, a lower FOV will reduce the amount of information that can be extracted from the user's environment, and may have a negative impact on activity classification accuracy. If a lens with a higher FOV or a fisheye lens is used, it may be necessary to provide distortion correction to the image data in preprocessing before the image is passed into any further image processing models to maintain accuracy of the Activity Classification Program 1202. This distortion correction processing may be applied onboard the wearable device 1000 itself, or within the preprocessing 11104 of the Activity Classification Program 1202. In the interest of simplicity and space saving, it is recommended that the camera module 3005 would connect to the main circuit board 7004 via an FPC (Flexible Printed Circuit) or FFC (Flat Flexible Cable) which passes first through a thin slot on the right side of the hinge joint of the frame front housing 7006, which can be seen in the rear perspective diagram 7200. The camera FPC or FFC cable would then slot into an FPC/FFC connector mounted on the main circuit board 7004. In ideal embodiments, the capacitive touch sensor 3003 would connect to the main circuit board by means of one or more conductive wires. The capacitive touch sensor may be composed of any conductive material, which may include but is not limited to, conductive metals (ie. Silver, Copper, Steel, and Iron), conductive plastics, and conductive 3D printing filament. Conductive plastics or conductive 3D printing filament may be preferable solely to reduce manufacturing costs. The conductive wire(s) connecting the touch sensor 3003 to the main circuit board 7004 would be soldered into one or more through holes on the main circuit board, and the conductive wire(s) may be affixed to the touch sensor by any means. For simplicity, one or more partial cylinders may be designed horizontally into the touch sensor 3003 itself, such that the conductive wire(s) can slot into the cylinder(s) forming an interference fit (or friction fit). Alternatively, the wire(s) may be affixed to the touch sensor 3003 by means of a solder joint, conductive adhesive, or other means. In ideal embodiments, the microphone is integrated directly into the main circuit board 7004 for simplicity, and does not require any external wiring, however, a microphone separate from the main circuit board 7004 connected via another interface to 7004 may also be used to achieve the same effect. A multicolor LED may also be integrated directly into the main circuit board 7004 in order to relay visual feedback to the user, although other embodiments may be used to achieve the same effect. The multicolor LED can be made visible to the user either by a small slot/hole built or cut into the right temple main housing 7002, or by manufacturing the right temple main housing 7002 out of transparent or translucent materials. In ideal embodiments, both the left and right sound transducers 7013 and 7001 receive analog signals from the main circuit board 7004, however, if the sound transducers have built in DACs (Digital to Analog Converter), they can instead receive digital signals from the main circuit board 7004. In the case where the sound transducers 7013 and 7001 receive analog signals, one or more DACs are integrated into the main circuit board 7004 itself, and the DAC output(s) are the analog signals transmitted to the sound transducers 7013 and 7001 by means of two or more conductive wires. The conductive wires are soldered into each sound transducer and the main circuit board 7004 on both ends. Note that in some situations, FPC/FFC cables may be used in addition or instead of the conductive wires to connect one or more of the sound transducers to the main circuit board 7004, which may be preferable in order to save space. As the left sound transducer 7013 is located on the temple opposite of the main circuit board 7004, the wires or FPC/FFC cables carrying the analog signal to the left sound transducer would thus pass through the hollow frame front housing 7006. Bone conduction or directional speakers are preferred in order to prevent unwanted sound leakage to the environment, although other sound transducers may be used. In ideal embodiments, the PPG module 3001 is a separate PCB (Printed Circuit Board) from the main circuit board 7004, and is located at the thin section of the right temple 3002 in order to get an accurate reading from the user's car. An open slot in the right temple face 7003 allows the PPG 3001 to be in direct line of sight from the user's car. In ideal embodiments, both the PPG module 3001 and the main circuit board 7004 would have FPC/FFC connectors, which would allow the PPG module to connect to the main circuit board via an FPC/FFC cable. In ideal embodiments, the power circuit 7012 both relays power to the main circuit board 7004 from either the micro USB port 3009 or the battery 7009, and also charges the battery when the micro USB port is connected to power. The power circuit 7012 may relay power to the main circuit board 7004 through either an FPC/FFC cable, or two or more conductive wires, however, an FFC cable is preferred in order to save space and simplify the assembly process. In the case of an FFC/FPC cable, both the power circuit 7012 and the main circuit board 7004 would have FPC/FFC connectors mounted on their respective PCBs, and the FFC/FPC cable would pass through the hollow frame front housing 7006 in order to reach the main circuit board. In the case where conductive wires are used to power the main circuit board 7004, the wires would be soldered into through holes on both the power circuit 7012 and the main circuit board 7004. Slits located outside of the hinge joints on both the left and right sides of hollow frame front housing 7006 allow FPC/FFC cables or conductive wires to pass through the frame front housing with ease (as seen in the rear perspective diagram 7200). The battery 7009 and micro USB 3009 would both be connected to the power circuit 7012 via separate conductive wires, soldered into through holes on the power circuit. These wires would be similarly soldered into the through holes on the micro USB PCB module 3009, and soldered onto the positive and negative terminals of the battery 7009. A battery PCM (Protection Circuit Module) may either be integrated into the battery module 7009 itself, or built into the power circuit 7012. The purpose of the PCM is to protect the battery against high-risk conditions, such as overvoltage, undervoltage, or shorting. A LIPO (Lithium Polymer) or LI-ION (Lithium Ion) battery is preferred, as they are compact and commercially available, although other battery types may be used in 7009. Ideally, the battery would have the maximum possible capacity while still being able to fit in the left temple 3008, and through experimentation, this value has been found to be approximately 250 mAh, although other battery capacities may be used.

In the foregoing exemplary embodiment, the right and left lenses 7005 and 7008 respectively may function as any standard type of eyewear lens. This includes, but is not limited to, vision correction lenses, UV or blue light blocking lenses, polarized and/or tinted lenses, transition lenses, and plano lenses. These lenses may be affixed to the frame front housing 7006, either permanently, or temporarily, by any means, which includes, but is not limited to, adhesives, friction fitting, and "v-cuts" seen on standard eyewear.

The foregoing exemplary embodiment may furthermore be produced by the following manufacturing and assembly process. The PCBs for the main circuit board 7004, the optional PPG 3001 (if used), the charging circuit 7012, and the micro USB module 3009 are first fabricated using a standard PCB fabrication process. The camera module 3005 is also manufactured via a standard PCB or FPC fabrication process, or is purchased commercially off the shelf. The PCBs for 7004, 7012, and 3009 are then assembled with the required circuitry components, via a standard PCB assembly process (ie. either manually or with a pick and place machine). The main structural components of the frame 7002, 7003, 7006, 7007, 7010, and 7011 are then manufactured appropriately based on the chosen material. For instance, if polycarbonate is used, the structural components may be plastic injection molded. Alternatively, if cellulose acetate is used, a sheet stock method may be preferable, where the material is formed and milled into the desired shape. Other manufacturing processes such as 3D printing may be used on these structures to achieve the same effect. Once the PCBs are assembled and the structural components of the frame are manufactured, the camera module 3005 is then inserted into the finished frame front housing 7006. The FPC/FFC cables, as well as any conductive wires are also passed through the frame front housing 7006. The frame front housing 7006 hinge joints are then aligned with the hinge joints on the right and left temple main housings 7002 and 7010, and the hinge pins 3004 and 3007 are inserted. From here, all of the internal hardware 3001, 7001, 7004, 7009, 7012, 7013, and 3009 are slotted into their respective positions in either the left or right temple main housings, and all FPC/FFC cables, conductive wires, and other interfaces are connected as necessary. The right temple face 7003, left temple face 7011, and the frame front face 7007 are then attached to the right temple main housing 7002, left temple main housing 7010, and frame front housing 7006 respectively. The touch sensor 3003 is then affixed to one or more conductive wires which are soldered into through holes in the main circuit board 7004. The touch sensor 3003 is then slotted into the right temple face 7003 and affixed by adhesives or other means. Once this process is complete, the gaps between the structural housings (7002, 7006, and 7010) and the structural faces (7003, 7007, and 7011) are then sealed by means of plastic welding, adhesives, or any other method. Finally, the lenses 7005 and 7008 are inserted and affixed by any appropriate means (for instance, adhesives, friction fitting, or "v-cuts" seen on standard eyewear). The assembly is then complete and ready for further testing and/or order fulfillment.

In some embodiments of the present disclosure, the tactile sensor may be realized by other means, such as a physical button instead of a capacitive touch sensor.

In some embodiments of the present disclosure, the micro USB port 3009 may be replaced by one or more physical connection ports or interfaces of any kind. Such interfaces may include, but are not limited to, USB-C, lightning ports, custom contact interfaces, or others.

In some embodiments of the present disclosure, the PPG 3001 may be replaced by other forms of HR or blood oximetry sensors, which includes but is not limited to ECGs (electrocardiogram sensors). In some embodiments of the present disclosure, an HR sensor may be omitted entirely from the design.

In some embodiments of the present disclosure, the battery module 7009 may be removable by the user, to allow for quick interchange. In such embodiments, the battery module 7009 may be charged while installed or via a separate charging device.

In some embodiments of the present disclosure, the SD card may be removable by the user, and the wearable device 1000 would be designed such that the SD card is easily accessible, or the wearable device can be easily taken apart.

In some embodiments of the present disclosure, a battery charging strap connecting to the ends of both glasses temples may be used to supplement battery power.

Figure 7:
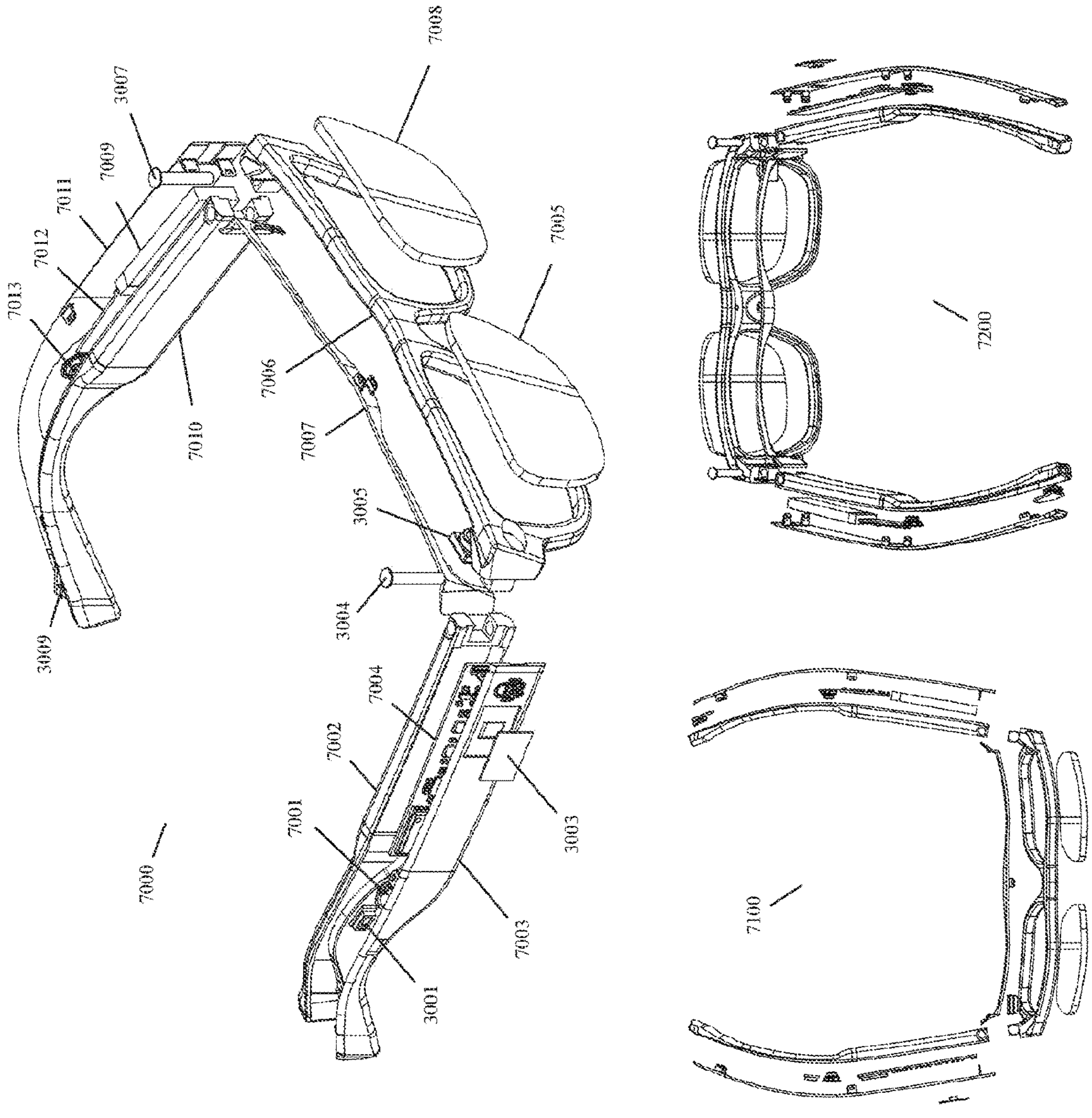
FIG. 7 depicts one potential configuration of the electronic hardware layout within the wearable device.

In some embodiments of the present disclosure, the hardware layout of the wearable device may deviate from the images FIG. 3 and FIG. 7, and may involve any arbitrary positioning of the required hardware (CPU, wireless transmitter, and camera module/image sensor) and other components.

In some embodiments of the present disclosure, other wearable device designs may be used instead of eyeglasses. Such embodiments include, but are not limited to, a headset, hat, or earpiece.

In some embodiments of the present disclosure, the wearable device may not need to be designed specifically for activity tracking, and instead allow third party developers to utilize the onboard sensors for any purpose. Such a wearable device may have a built in API (Application Programming Interface) or SDK (Software Development Toolkit) that enables faster development of third party applications or interfaces. In such embodiments of the present disclosure, activity tracking software could be added or integrated into the wearable device afterwards, despite not being hardcoded into the original wearable device itself. In some embodiments of the present disclosure, such a wearable device may incorporate other sensors or user interfaces, including but not limited to eye-tracking sensors or AR displays.

In some embodiments of the present disclosure, the image sensor 3005 may be replaced with a LIDAR (light detection and ranging) or equivalent sensor which would provide similar information regarding the user's environment and surroundings which could be passed into an Activity Classification Program 1202 which would then be used to track user activities. In some embodiments of the present disclosure, various other sensors that can obtain information from the user's environment or surroundings may be used to replace the image sensor 3005 or LIDAR sensor to achieve the same effect.

Figure 4:
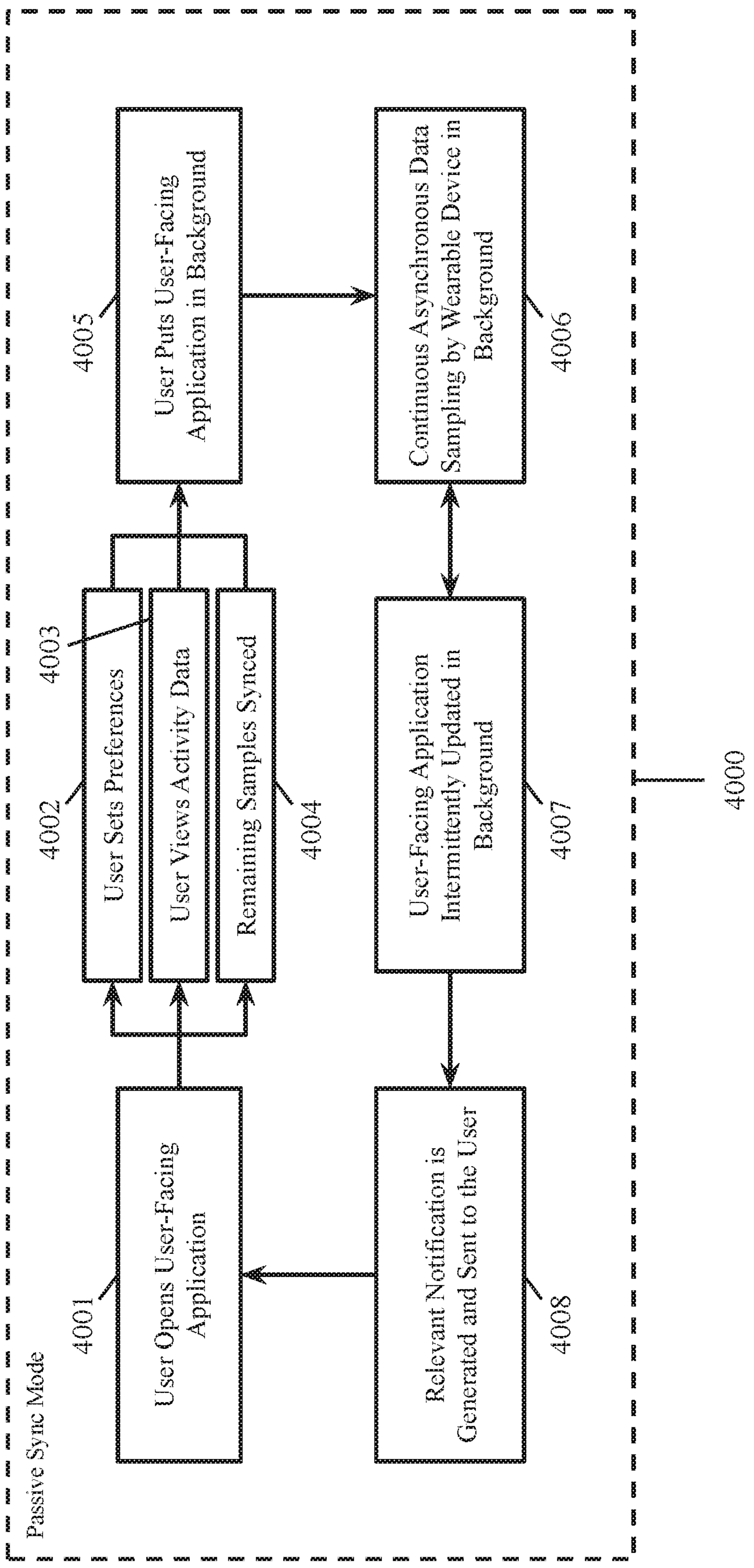
FIG. 4 depicts one potential use case of the invention, according to some embodiments of the present disclosure. In passive sync mode, the user-facing application receives and processes data intermittently.

FIG. 4 describes one potential embodiment of the passive synchronization process through which the wearable device 1000 and the user-facing application 1100 exchange data, and how a user would interact with this system in a typical use case. The process starts with the user opening the user-facing application in block 4001, after which they have the option of setting their user preferences in 4002 and reviewing the activity data in 4003 which has been previously synced. If the device 1000 is within range of the user's personal computer or mobile device, it will connect wirelessly to the user-facing application 1100, at which point the device will start continuously transferring data samples saved on the wearable device 1000 that have accumulated while it was running independent from the user-facing application 1100. When data samples are transferred to the user-facing application 1100, the classified activities corresponding to the data samples are then processed by the activity classification program 1202, and the UI for the user-facing application is updated so that the user may review their activity metrics, history, and trends. This process will continue until the user closes the user-facing application, at which point the data sync stops, unless the user puts the user-facing application in the background as shown in block 4005. The device will continue sampling data at its regular sampling rate, and when background tasks are initiated by the user's personal computer or mobile application, the user-facing application will connect to the device wirelessly and continue transferring the data samples until either all of the data samples have been transferred, or the background task is forced to end. After receiving data samples during a background task, the user-facing application will update the users activity information with the data it has received and processed in block 4007. These background processes will continue as long as the user-facing application 1100 is running in the background. Occasionally, after updating the user-facing application with the data received from the device, it may send the user a notification to provide feedback on their recent activity history, as shown in block 4008. The user may be prompted to re-open the user-facing application 4001 so as to review their activity metrics, trends, and history.

Note that there are many embodiments of the present disclosure that may employ other logic architectures that may be used alternatively to achieve the same effect. Any system that allows the data from the wearable device to be transferred to the user-facing application such that it can update its UI to reflect the new data for the user to review will suffice, whether it takes place while the application is open, in the background or otherwise. This also includes any logic determining when the user is sent notifications or encouraged to open the user-facing application and view the new data, and any system flow that allows them to configure the application such that the received data can be classified in varying levels of productivity according to their preferences. For example, the user may be prompted to decide whether the detected activity is productive, unproductive or neutral after the data has been collected, rather than having the user set these preferences initially. The advantage of this is that the user can dynamically set the value of each activity according to their daily goals or schedules.

Figure 5:
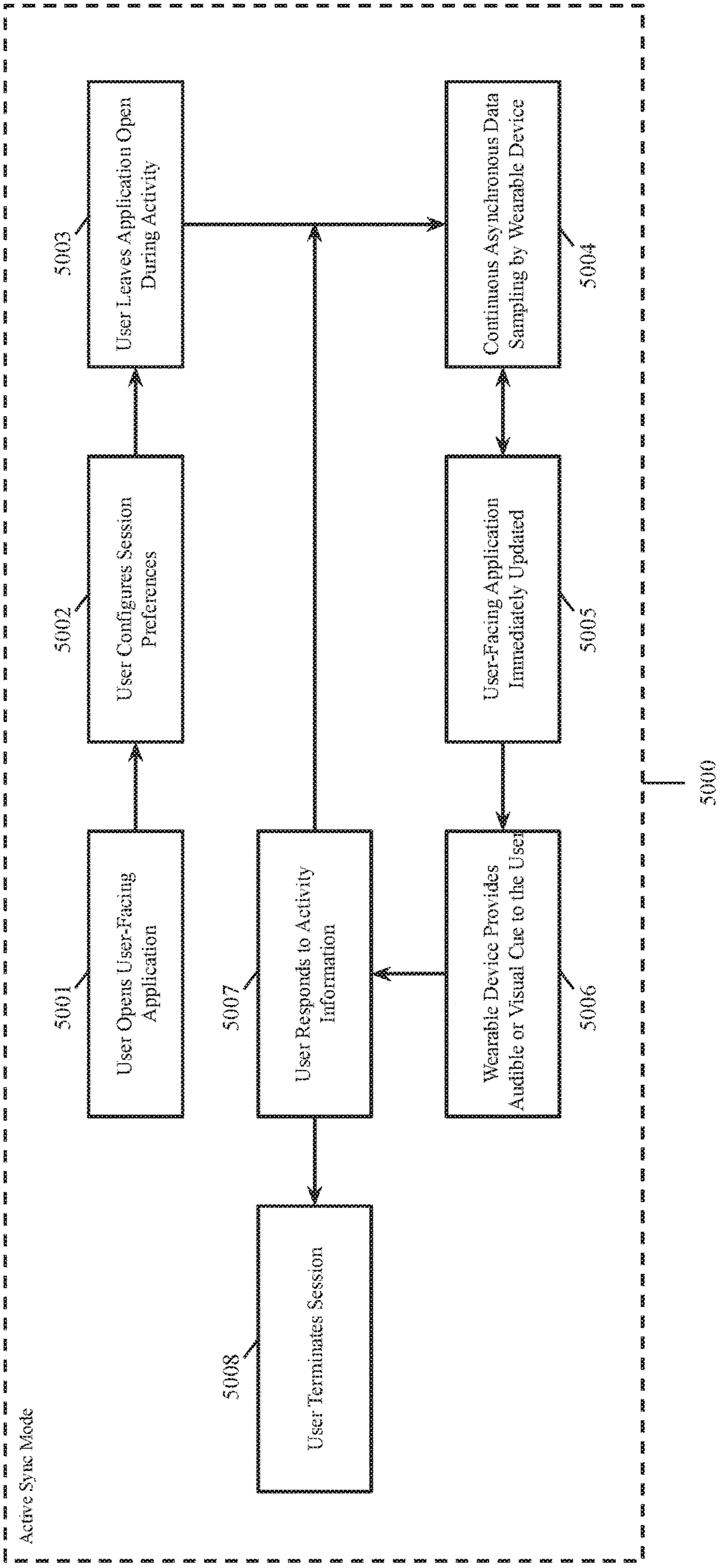
FIG. 5 depicts another potential use case of the invention, according to some embodiments of the present disclosure. In active sync mode, the user-facing application remains open and processes data immediately as it becomes available (ie. in real time).

FIG. 5 describes one potential embodiment of the active synchronization process through which the user-facing application 1100 and the wearable device 1000 exchange data, and how the user would interact with the system in a typical use case. This process begins with the user opening the user-facing application in 5001, configuring their session settings and starting their active session in 5002. Throughout the duration of the active synchronization, the user must leave the user-facing application open as indicated by block 5003. During the active session, the wearable device 1000 would capture and immediately transfer data samples to the user-facing application 1100, as shown by block 5004. The user-facing application is updated as soon as it receives and processes the data from the wearable device 1000, as shown by block 5005. The activities corresponding to the data samples are then classified via the activity classification program 1202, and the completion of the data transfer will cause the device to capture the next data sample so it is ready for transfer in block 5004. This syncing process continues until the user-facing application 1100 detects a change in the user's current activity, at which point it will request that the wearable device 1000 administers an audible or visual cue as necessary. For instance, the wearable device may display a certain color or emit an audible sound to the user when the user has started to engage in an activity that they previously defined as being productive or unproductive. The user can then respond to this feedback by either ignoring the cue or modifying their behaviour. This synchronization process and real time feedback delivery will continue until the user terminates the session or closes the user-facing application as shown in block 5008.

Similar to FIG. 4, there are many embodiments of the present disclosure that may employ other logic architectures that may be used alternatively to achieve the same effect. For the embodiment where all activity classification is processed directly on the wearable device, there is no need for data to be continuously transferred between the device and the user-facing application. The user-facing application may need to communicate the productivity and session preferences to the wearable device, after which the device can sample, process and classify data as either productive, unproductive or neutral and notify the user through an audio or visual cue independent from the user-facing application. Further, if the activity and session preferences have already been transferred to the device, the session could be initiated through user input to the wearable device itself instead of through the user-facing application, and could be similarly terminated.

In some embodiments of the present disclosure, the logic outlined in FIG. 4 and FIG. 5 may be omitted almost completely, in the use case in which the user only needs to obtain their activity information from the User Facing Application 2100. In such an embodiment, any data synchronization process between the Wearable Device 1000 and the User Facing Application 2100 will suffice.

Figure 6:
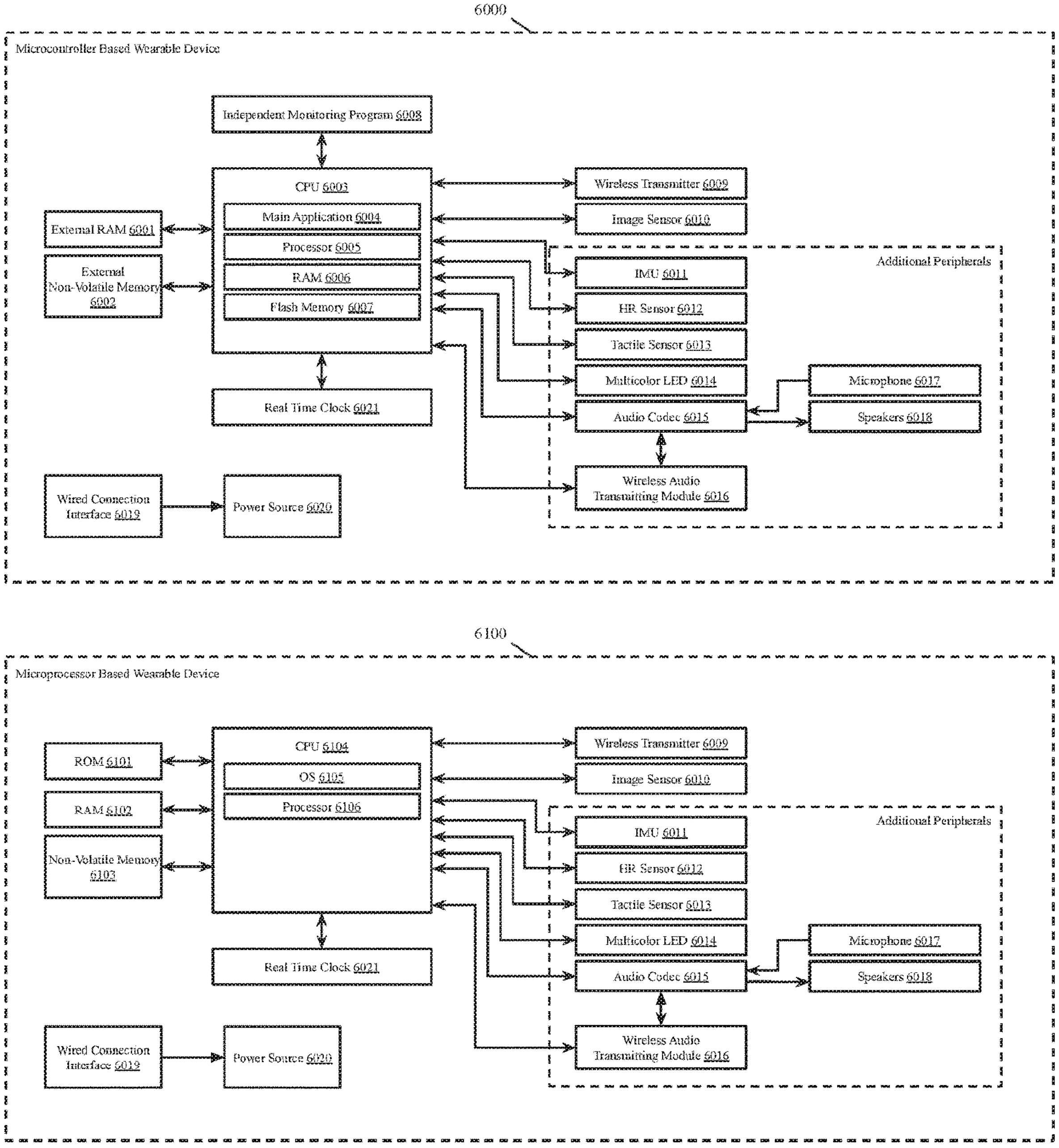
FIG. 6 depicts the electronic hardware architecture of the wearable device, according to some embodiments of the present disclosure.

FIG. 6 is a diagram illustrating potential embodiments of the circuitry design of the present invention. In exemplary embodiments of the present disclosure, a microcontroller is used as the main CPU 6003 as illustrated in diagram 6000. In such embodiments, the use of a microcontroller over a microprocessor is preferable so as to minimize power consumption and maximize the battery life of the wearable device 1000. As such, it is recommended that such a system is based on a 32-bit microcontroller or higher, with a sufficiently high clock speed (ie. on the order of ~10 MHz or higher) to process necessary tasks. While many microcontrollers may be used to achieve the intended effect, a microcontroller embedding an ARM Cortex-M series chip is one of many preferred solutions, as they are readily available commercial off the shelf products. In ideal embodiments, the CPU 6003 manages the main functions of the wearable device 1000, using the software logic outlined in FIG. 8. Such logic may be implemented by means of an RTOS, an event driven super loop, a polling superloop, or any other embedded architecture, however, an RTOS or event driven super loop is preferable to achieve consistent and reliable operation. Furthermore, an independent monitoring program 6008 or "watchdog" may be used to monitor the CPU and reset the system in the event of an unforeseen error or long software hang, although this is not necessary. While not necessary, internal RAM 6006 can also be used to meet the minimum required computing capabilities. External RAM 6001 and non-volatile memory 6002 are also recommended, but not required to meet the minimum required computing capabilities, as well as providing a means of storing sample data before it is transmitted elsewhere. In some embodiments of the present disclosure, only internal RAM 6006 may be required provided there is enough memory to effectively store images while completing all other tasks required by the CPU. In ideal embodiments, at least 4 MB of combined internal and external RAM is used to temporarily store sample data before it is transferred to non-volatile memory 6002, although lower amounts may be used if the sample data is compressed and/or images are captured at lower resolutions. Furthermore, a high speed parallel interface should be used between the external RAM chip 6001 and the CPU 6003 in order to minimize latency and maximize data transfer speeds. For simplicity, a micro SD card can be used as non-volatile memory 6002, although other types of non-volatile memory would suffice to achieve the same effect. In ideal embodiments, at least 8 GB of non-volatile memory is used to store sample data locally before it is transmitted elsewhere, although lower amounts may be used if the sample data is compressed and/or images are captured at lower resolutions (or at lower sample rates). In the case of a micro SD card, the SPI communication protocol may be used to interface between the micro SD card and the CPU 6003, as the SPI interface is available on many commercially available microcontrollers, and reduces the need for excess copper traces on the main circuit board 7004. In ideal embodiments, a BLE wireless transmitter 6009 is integrated into the main circuit board 7004. Additionally, the camera module 3005 contains an image sensor 6010 which would interface directly with the CPU 6003. The BLE wireless transmitter would interface with the CPU 6003 by any means, depending on the interfaces available on both the BLE module and the CPU. A SPI interface is recommended for this application, simply due to the interfaces that are available on most commercial off the shelf products, although other interfaces may be used. Furthermore, in ideal embodiments of the present invention, the BLE module would be able to support a throughput of at least 200 kbps, with higher throughputs being preferable in order to reduce the time required to transfer sample data from the wearable device 1000 to the user-facing application 1100. However, a BLE module with a lower throughput may also be used if the sample data is compressed and/or images are captured at lower resolutions (or at lower sample rates). In ideal embodiments, the image sensor 6010 would be able to support a resolution of at least 1080×720, as well as JPEG (Joint Photographic Experts Group) compression, however, these requirements are not necessary. The image sensor 6010 may interface with the CPU 6003 by any means, depending on the interfaces available on both the image sensor and the CPU. However, MIPI-CSI or DVP (8-bit, 10-bit, or 12-bit) are preferred due to the availability of these interfaces on common commercial off the shelf products. Additional peripherals, such as an IMU 6011, HR sensor 6012, tactile sensor 6013, multicolor LED 6014, audio codec 6015, wireless audio transmitting module 6016, microphone 6017, and one or more sound transducers 6018 may also be used to supplement the functionality of the wearable device 1000, but these peripherals are not necessary in order for the wearable device 1000 to meet the minimum functionality of the system described by the present disclosure. A wired connection interface 6019 is also used to either power the wearable device, charge the onboard battery 7009, transfer data, or update the wearable device 1000 software. While a micro USB connection is a preferable method of realizing such a wired connection 6019 due to universality, any other type of physical port may be used as appropriate.

In exemplary embodiments of the present disclosure, the CPU 6003 or 6104, the wireless transmitter 6009, external RAM 6001 or 6102, non-volatile memory 6002 or 6103, ROM 6101 (if required), RTC 6021, would all be integrated into the main circuit board 7004, although other configurations may be used. Note that the RTC may be packaged with the CPU, or installed on the main circuit board 7004 separately. Additionally, optional peripherals such as the IMU 6011, multicolor LED 6014, audio codec 6015, and wireless audio module 6016 may also be integrated directly into the main circuit board 7004.

In alternative embodiments of the present disclosure, a microprocessor is used as the main CPU 6104 as illustrated in diagram 6100. In such embodiments, the use of a microprocessor over a microcontroller is preferable when computing power is a priority over power consumption. Such instances may include, but are not limited to, the integration of a heads up or AR display, local image preprocessing and/or compression, or instances where the activity classification program 1202 is run locally on the wearable device 1000. While the main logic of the wearable device software may achieve a similar effect to that of the microcontroller based system 6000, the implementation of such logic may be fundamentally different as a full OS (Operating System) is likely to be used instead of an RTOS or event driven superloop architecture. In such embodiments, the OS may be realized by any means, including, but not limited to common existing operating systems (such as Android, Linux, or Windows), or custom built operating systems designed specifically for the wearable device 1000. As most microprocessors do not have internal RAM integrated, it is likely necessary that external RAM 6102 and external non-volatile memory 6103 are integrated into the main circuit board 7004 as peripherals. External ROM 6101 would also be used in such a system to permanently store the instructions needed for the initialization of the system 6100.

In some embodiments of the present disclosure, other types of CPUs may be used. Such CPUs may include, but are not limited to, any type of processing mechanism, including microprocessors and microcontrollers. This includes reduced instruction set computers (RISC) and complex instruction set computers (CISC), as well as any equivalent controllers capable of performing the same or similar function. The term CPU may encompass any processor systems, including those with one or more processor cores. It also includes application specific integrated circuits (ASICs), logic circuits, or any combination of the foregoing processor mechanisms.

In some embodiments of the present disclosure, the CPU 6003 or 6104 and the wireless transmitter 6009 may be combined into a single chip or module to achieve a similar effect. The antennae of such a chip may be integrated into the module, or connected separately.

In some embodiments of the present disclosure, a programming circuit may be integrated as part of the built in hardware in order to allow software/firmware updates when initiated by the user or the user-facing application.

In some embodiments of the present disclosure, one or more additional sensor inputs may be used for eye-tracking. Eye-tracking may be implemented by means of Infrared Oculography (IOG), Electro Oculography (EOG), Video Oculography (VOG), or others. Such input devices may include, but are not limited to, image sensors, infrared image sensors, or electrodes used in conjunction with ADCs.

In some embodiments of the present disclosure, one or more additional sensor inputs may be used for brain-sensing. Brain sensing may be implemented by any means, including, but not limited to EEG or fNIRS (Functional near-infrared spectroscopy). In such embodiments, brain-sensing may be useful to determine the user's level of focus or mental state, which could assist in predicting their behaviors. In some embodiments of the present disclosure, this data may be first processed to determine the user's mental state, which then may be used as an additional input into the activity classification program 1202. Such a brain-sensing device may be built into the wearable device 1000 itself, or through external hardware which would communicate with the wearable device 1000 through any means.

In some embodiments of the present disclosure, a microphone or acoustic sensor may be used as an additional input device. Such a device may be integrated into the wearable device 1000 itself, or through external hardware which would communicate with the wearable device through any means. This audio data may be used to improve activity classification accuracy. In some embodiments of the present disclosure, the audio data may be processed through speech recognition or other software which may be used as an additional input to improve the accuracy of the activity classification program 1202. In other embodiments of the present disclosure, audio data may be used to ascertain elements of the user's environment (ie. whether they are indoors or outdoors, or if they are in an office space or a restaurant) through logic or other classification or regression models. This environment data may then be used as yet another input to improve the accuracy of the activity classification program 1202.

In some embodiments of the present disclosure, a GPS may be used as an additional input device. Such a device may be used to provide additional features and functions to the user through the user-facing application 1100. GPS data may also be used to improve the accuracy of the activity classification program 1202, as an additional input. In such an embodiment, GPS data would be useful to determine what environment or facilities the user may be in or around. For instance, if GPS data shows that the user is in a grocery store, the activity classification program 1202 may use basic logic or heuristics to determine that the user is currently grocery shopping. If the user is in a restaurant, the activity classification program 1202 may reasonably determine that the user is eating, based on the combination of GPS data and other input data. GPS data may be obtained from a GPS module built into the wearable device 1000 itself, or it may be obtained from the user's computer, mobile device, or some other external hardware.

In some embodiments of the present disclosure, a temperature sensor may be used as an additional input device. In such embodiments, changes in the user's skin or body temperature may be used to improve the accuracy of the activity classification program 1202, or provide other insights to the user through the user-facing application. For instance, temperature data may be used to ascertain whether or not the user is exercising, idle, or sleeping, as human skin temperature typically changes depending on the activity that the user is engaged in.

In some embodiments of the present disclosure, a heads up or AR display may be used as an output device of the circuit hardware in order to display relevant information and metrics directly to the user.

In some embodiments of the present disclosure, other wireless transmitters may be used instead of BLE. Such transmitters include, but are not limited to, Wifi, LTE, 3G or other RF transmitters.

In some embodiments of the present disclosure, I2S (Inter-IC sound) may be used as the digital audio protocol by which audio data is sent and received by different hardware or circuitry components.

In preferred embodiments of the present disclosure, the wireless audio transmitting module 6016 utilizes the HFP (Hands Free Profile) to stream audio data to and from the user's computer and/or mobile device.

In some embodiments of the present disclosure, the wireless audio transmitting module 6016 integrates an onboard DAC to convert digital audio data to analog audio data, in order to interface with the speakers/sound transducers 6018. The microphone module 6017 may have its own onboard audio codec so that it may send and receive digital data to the wireless audio transmitting module 6016 directly.

In some embodiments of the present disclosure, the wireless audio transmitting module 6016 and the wireless transmitter 6009 may be the same module, which would support both the data transfer required for normal data sampling, as well as audio data streaming to and from the wearable device 1000.

Figure 8:
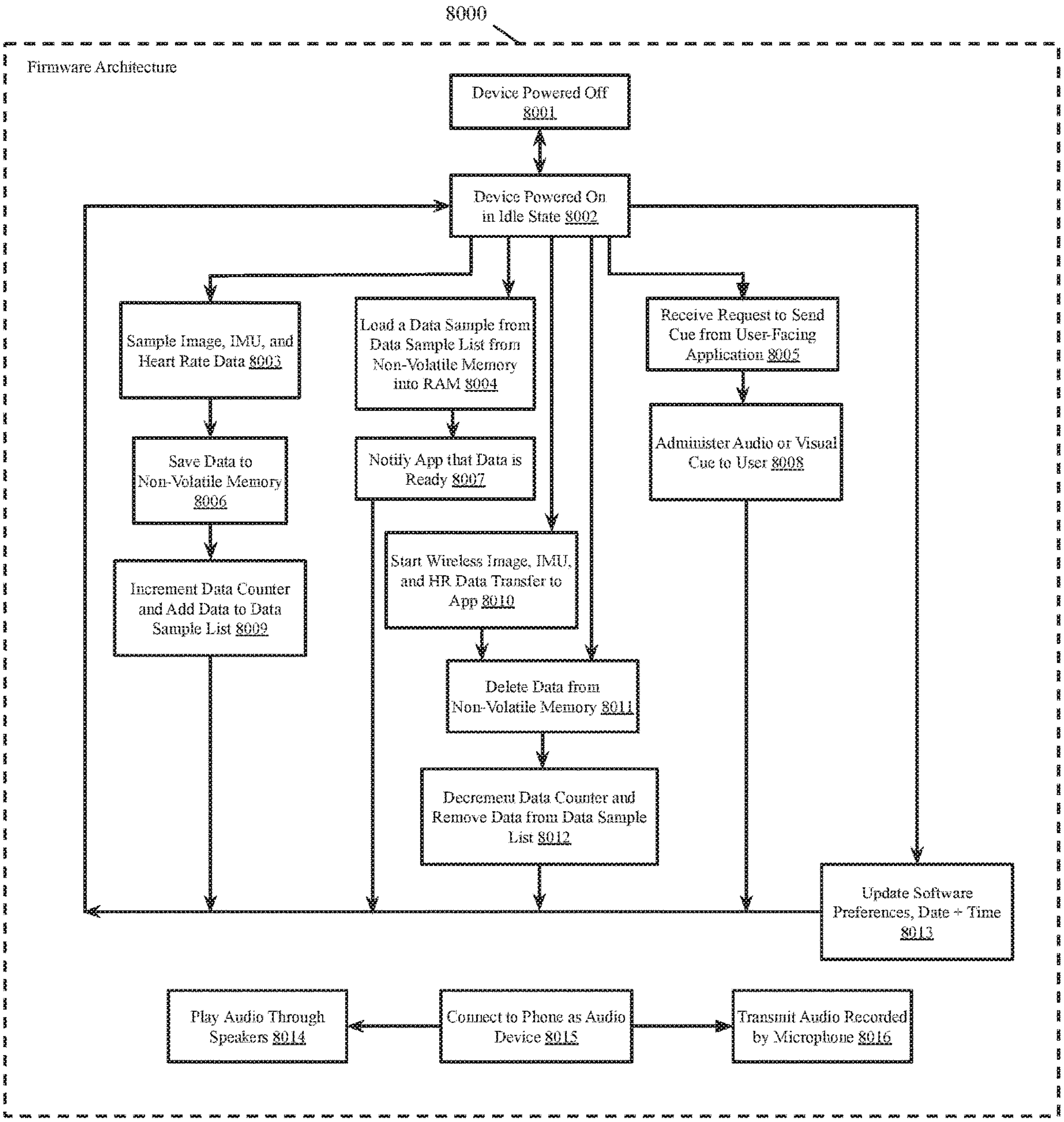
FIG. 8 depicts the software architecture of the wearable device, according to some embodiments of the present disclosure.

FIG. 8 illustrates one potential embodiment of the firmware architecture that the main CPU employs to sample data, transfer data, and interface with the user. Note that there are several other alternative architectures that would suffice to achieve a similar effect, and would be considered an obvious modification or extension of the present disclosure, including but not limited to embodiments where an OS is used and software logic is built into the wearable device through an application, rather than the firmware itself. The device can switch interchangeably between the powered OFF state 8001 and the powered ON/IDLE state 8002. In preferred embodiments, these states can be toggled through user input, by holding their finger to the tactile sensor for a certain period of time. The device will also automatically switch to the power OFF state 8001 when the measured battery voltage drops below a safe threshold, and will not allow the user to switch it to power ON/IDLE state 8002 until it detects that the battery has been sufficiently charged to a safe operational voltage. The device will remain in the power ON/IDLE state until an asynchronous event is triggered.

In some embodiments of the present disclosure, the tactile sensor input required to control the power ON/IDLE state or pause mode (or any other functions where the user may need to interface directly with the wearable device 1000) may take other forms, including but not limited to tapping twice, tapping thrice, two consecutive holds for a certain period of time, etc. The user may additionally customize the inputs to their preferences. Other embodiments can use customizable user input through the use of, but not limited to, pressing a push button or bringing their finger near an infrared proximity sensor using unique input profiles similar to that of the preferred embodiment.

In some embodiments of the present disclosure, the wearable device will continuously perform data sampling, and by default this is set to occur every 2 seconds, however, this can be adjusted to any value. Data sampling will also occur if there are no samples recorded in the data sample list, regardless of when the last data sample was captured. Data samples will only be recorded, however, if the device is not in pause mode. Pause mode can be activated and deactivated through user input, which can take any form as long as the input is uniquely distinguishable from the power toggle input. The preferred embodiment allows the user to toggle pause mode on and off by quickly tapping the tactile sensor twice. Doing so will change the color of the multicolor LED to indicate to the user that their input has toggled pause mode. The data sampling process begins by capturing any sensor data that the device is equipped to record 8003. The preferred embodiment includes image data from a camera, motion data from an IMU sensor, and heart rate data. The minimum data required for activity classification is image data, however, additional inputs may also be used, including, but not limited to GPS data, EEG data, or eye tracking data. Upon capturing the data sample, the current time from the RTC is recorded and is used to timestamp the data sample. The data sample is then saved to non-volatile memory in block 8006, followed by incrementing the data counter and adding the data sample to the data sample list in block 8009. The data counter indicates how many data samples exist in the data sample list, and the data sample list is a data structure that keeps track of the data samples saved to non-volatile memory that still need to be transferred to the user-facing application 1100 for processing. The data samples are added to the data sample list such that the data sample list contains sufficient information to uniquely identify and retrieve each data sample from non-volatile memory. The preferred embodiment uses the timestamps as unique identifiers for the data samples, however this can take the form of any unique data ID. The preferred embodiment uses a stack data structure for the data sample list to ensure the most recent data samples are the first to be transferred to the user-facing application, however this can also take the form of other data structures, including but not limited to a queue, heap, or linked list. After the data sampling process is complete, the device returns to the power ON/IDLE state 8002.

In some embodiments of the present disclosure, upon connecting to the user-facing application 1100, the device will load a data sample in the data sample list from non-volatile memory into RAM in block 8004 so that it is ready for transfer. The device then sends a notification to the user-facing application in block 8007 to indicate that data is ready for transfer, with the unique identifier for that data sample so the user-facing application can determine whether to accept or reject the data. The preferred embodiment sends the data sample timestamp and data size in the notification, however any notification that indicates data is ready for transfer with its unique identifier is sufficient. After notifying the user-facing application 1100, the device returns to the power ON/IDLE state 8002, awaiting a response from the user-facing application to proceed with the transfer.

In some embodiments of the present disclosure, when the user-facing application 1100 responds to the data ready notification, it can either accept or reject the current data sample. If the data sample is accepted, the device will initiate the data transfer process in block 8010. The preferred embodiment transfers the data sample through several packets, and the transfer of each packet is completed asynchronously. In between the transfer of individual packets or if the data transfer is interrupted, the device returns to the power ON/IDLE state until an event is triggered to send the next packet or complete the data transfer. During this time, it is able to perform other asynchronous events, such as capturing new data samples. However, any method of data transfer can be used to send the prepared data sample to the user-facing application 1100, asynchronously or otherwise. Once the data transfer is complete, the wearable device 1000 will delete the transferred data sample from non-volatile memory

8011, decrement the data counter and remove the data sample from the data sample list 8012. If the user-facing application rejects the data sample, the device will skip initiating the transfer 8010, and immediately proceed to delete the data sample from non-volatile memory 8011, decrement the data counter and remove the data sample from the data sample list 8012. After a data sample has either been successfully transferred or rejected (in either case removed from non-volatile memory and from the data sample list) the device will return to the power ON/IDLE state 8002. Since the previous data sample has been handled, the device will continue to prepare the next data sample in the data sample list from non-volatile memory 8004 so the next transfer is ready to begin.

For certain applications when it is not necessary to wait for each sample to become available, or when several data samples have accumulated on the device, it is possible to combine multiple data samples and use more efficient data structures or compression to store them together such that they can be transferred faster. For example, since image data typically has a much larger data size compared to other sensor data (ie. IMU or HR data), the data from other sensors can be bundled together and transferred all at once. Furthermore, several image frames or image data samples may also be bundled together and compressed, and transferred all at once. This would allow the user-facing application to receive data for a large number of timestamps faster than if the device transferred an image with every bundle of sensor data collected at each timestamp. However, the number of data samples that can be bundled together for more efficient transfer, especially for image data, is limited by the amount of RAM available for that specific embodiment of the hardware.

In some embodiments of the present disclosure, when the user-facing application 1100 is wirelessly connected to the wearable device 1000, it also has the option to set the device mode to passive or active. In passive mode, the device continuously samples and stores data, without requiring any interaction with the user-facing application, and without needing to communicate any live activity information directly to the user. In passive mode, the device will continue to accumulate data samples in the data sample list and in non-volatile memory independent of when the user-facing application initiates data transfer to clear the data sample list. Upon switching from the power OFF state 8001 to the power ON/IDLE state 8002, and whenever the user-facing application is not wirelessly connected to the device, the device mode is set to passive by default. In active mode, the device 1000 functions interactively with the user-facing application 1100 to provide real time activity feedback to the user. When the device is switched from passive mode to active mode by the user-facing application, it will save the data sample list and data counter to non-volatile memory, and create a new data sample list with the data counter initially set to zero in order to manage sending only recent data samples to the user-facing application. In active mode, the device will only capture one data sample at a time before transferring it to the user-facing application. Moreover, only when the device completes the transfer of the single data sample in the data sample list, it will capture the next data sample to transfer to the user-facing application. After the user-facing application 1100 has received and processed any image data from the device, it has the option to administer visual or audible cues through the wearable device 1000. Upon receiving this information from the user-facing application, the device will provide live feedback to the user. The preferred embodiment makes use of a multicolor LED and audio cues to notify the user, however, any method of notifying the user will suffice. For example, if the device is notified by the user-facing application that the user is being productive, it will set the multicolor LED to green, if it is notified that the user's productivity is neutral it will set the LED color to white, and lastly if the user is being unproductive, it will set the LED color to red and notify the user with an audible cue. If the user-facing application switches the device mode from active to passive, or the user-facing application disconnects from the device setting its mode to passive by default, the device will discard the data sample list from active mode, and load the passive mode data counter and data sample list from non-volatile memory to RAM to continue sampling and transferring data from where it was last.

In some embodiments of the present disclosure, various other interfacing methods may be used to provide feedback to the user based on their activities. Such methods may include, but are not limited to haptic feedback, vibration (using vibration motors), or heads up or AR displays.

For an alternative embodiment where the device can run the activity classification locally, each data sample can be processed immediately after it is captured to determine what activity the user is engaged in. The user-facing application can wirelessly communicate the user's productivity preferences and configurations, which the device can use to determine whether the detected activity is productive, neutral or unproductive. In this case, passive mode would consist of data sampling followed by data processing, and the detected activities could be stored on non-volatile memory with their respective timestamps in the place of the actual data samples. When the user-facing application wirelessly connects to the device, the device transfers the time stamped activity data for the user-facing application to display in its UI. In active mode, the device can determine the productivity status of the user without requiring any communication with the user-facing application, assuming its mode has already been set as active, and the user's productivity preferences have been uploaded to the device. This would mean the device could display more immediate real time feedback to the user without the delays of transferring large amounts of data wirelessly to the user-facing application. This would also allow active mode to be initiated independently from the user-facing application, simply from user input to the wearable device. In either case, active mode would accumulate the same kind of timestamped activity data as passive mode, so that it can be transferred to the user-facing application upon connecting to be displayed in its UI for the user to view. However, considering the computational resources available on board the device may be very limited compared to the computational capacity of an online webserver, the device may have to use a condensed version of the activity classification model.

In addition, the user-facing application can configure the device's software settings when it is connected to it wirelessly. It can update the time on the device's RTC to ensure the timestamps saved with the data samples are accurate, in addition to configuring settings including but not limited to the data transfer speed and the data sampling period.

In some embodiments of the present disclosure, the image data sampling rate may be variable, and IMU data may be used to determine the optimal time to capture image data. Such logic may be employed on the wearable device 1000 itself. In such an embodiment, it would be preferable to capture image data when the user is moving their head the least, in order to avoid motion blur in the image data which may impact the accuracy of activity classification.

In some embodiments of the present disclosure, when the user's personal computer or mobile device is connected to the wearable device 1000 as an audio device as outlined in 8015, the user's personal computer or mobile device can transmit and play audio data through the device 8014. This can take the form of, but is not limited to, music or video audio data. The user is also able to take calls through the wearable device 1000, in which case audio data is captured by the microphone on board the device and is transmitted to the user's personal computer or mobile device as indicated by block 8016. The device will also accept user input via a tactile sensor in order to control the audio media being streamed. This functionality includes but is not limited to pausing the audio, resuming paused audio, skipping to the next or last song/video on the user's personal computer or mobile device, adjusting the volume of the audio, and accepting or ending calls.

In some embodiments of the present disclosure, it may be preferable that there is a system in place to reset the CPU on board the device or other peripherals should any errors occur during regular operation. This would include but is not limited to using independent watchdogs, independent monitoring devices, error handling that can control the reset lines of peripherals if they fail, or the ability for the user to reset or disconnect the device from power. The preferred embodiment makes use of an independent watchdog that will automatically reset the CPU if it is not continuously refreshed within a specific window of time. Hence, if the CPU hangs or gets stuck in a loop, it will be reset and can continue processing after reinitializing using the data and states saved to non-volatile memory. Accordingly, if the CPU encounters any fatal errors, the error handling process may enter an infinite loop to reset the system through the watchdog. In addition, the reset lines of the peripherals are connected to the CPU as outputs, so that if they were to encounter any errors the CPU would be able to reset them directly.

In some embodiments of the present disclosure, the wearable device software architecture would consist of some form of periodic or continuous data sampling with wireless data transfer to the user-facing application. In such an embodiment, an important aspect of data sampling is the image data capture with accurate timestamps, and a method of storing such samples on the device. Accordingly, the data transfer process should be able to transmit the captured images and their timestamps wirelessly to the user-facing application so the data can be used for activity classification. In this case, no user input is required, pause mode would always be disabled, and the device will always remain in the power ON/IDLE state when it is not capturing or transferring image data. In alternative embodiments, the device may capture one image at a time and store it on RAM until it connects to the user-facing application and completes the data transfer, after which it would sample the next image. In this embodiment, use of non-volatile memory and the use of a data structure to keep a record of the accumulated data samples awaiting transfer would not be necessary. However, this would mean that the user should always keep the user-facing application open and connected to the device whenever they wanted to use it for activity tracking.

Figure 9:
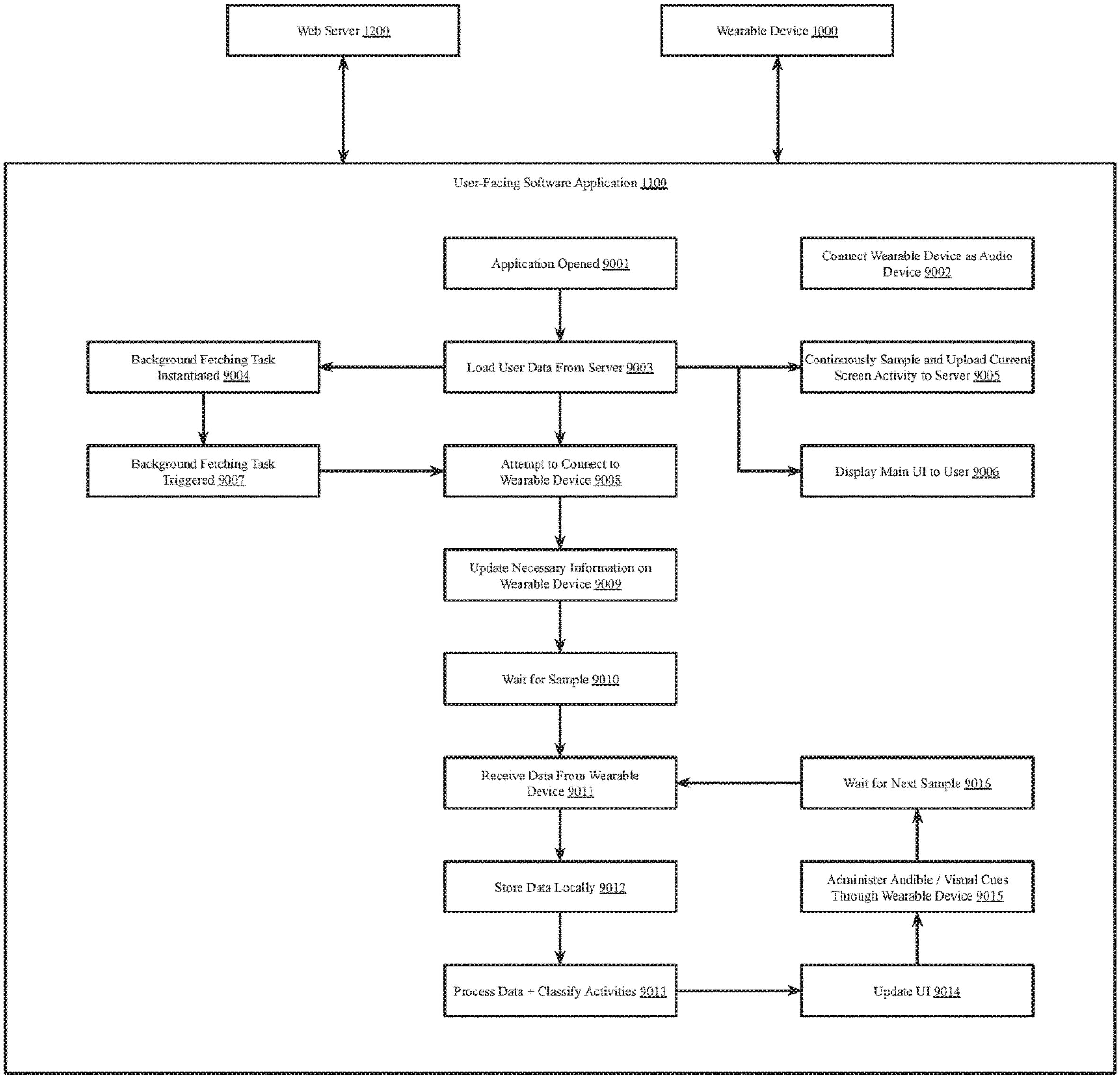
FIG. 9 depicts one potential configuration of the user-facing software application.

In some embodiments of the present disclosure, FIG. 9 would illustrate the main logic of the user-facing application 1100 needed to fetch sample data from the wearable device 1000, process said sample data, and update the UI (user interface). When opened, the application would first verify the user's credentials before loading user data from the server in 9003. The application would then attempt to connect to the user's wearable device 1000, if available, in order to fetch the most recent sample data. The application may also instantiate a background fetching task in 9004 to occasionally fetch sample data from the wearable device 1000 in the background. Once connected, the application would also update the date and time on the wearable device 1000 in block 9009, so as to ensure that the wearable device is timestamping the sample data accurately. Once the sample data is received by the user-facing application 1100, the data is processed, and the user's activities corresponding to the sample data are classified. Activity classification may be done either locally (as shown in FIG. 2), or outsourced to an external web server (as shown in FIG. 1). After each data sample is classified, the UI of the user-facing application is updated in 9014 to reflect the user's most recent activity metrics, history, and trends. The user-facing application 1100 may also optionally administer an audible and/or visual cue through the wearable device 9015, in order to give the user immediate feedback based on their activities. This feature may be useful if the user has specifically configured the user-facing application and wearable device in active sync mode, as illustrated in diagram 5000. The user-facing application 1100 would continue to attempt to fetch sample data from the wearable device 1000 as long as it is open 9016, and may attempt to intermittently fetch data samples if the user-facing application is put in the background. It is therefore recommended to the user that the user-facing application is kept in either the foreground or background at all times in order to receive consistent updates.

In some embodiments of the present disclosure, the UI of the user-facing application 1100 further provides other features and functionalities in addition to activity tracking in order to help the user manage their time. These features may include, but are not limited to:

1) Gamification, by which the user is rewarded for reaching certain goals or completing certain tasks. Such rewards may be purely provided through the user-facing application 1100 (ie. a points system), or may be real physical or financial rewards/discounts sent to the user.
2) Mindfulness training, by which the user is prompted to take part in a mindfulness training session when they become distracted for long periods of time.
3) Visual or audible cues, which are sent to the user to notify them when they become distracted from the task at hand.
4) Financial deposits, which are made by the user when they initiate a new activity goal or task, and only returned to the user upon successful completion of said goal or task.
5) Actionable insights, which are automatically generated recommendations that the user can take to reduce distractions around them, or improve their focus or motivation.

In some embodiments of the present disclosure, additional logic, classification, or regression techniques may be used to provide automatically generated recommendations that the user can take to improve their performance or productivity. Such a program may be implemented on the web server 1200, the user-facing application 1100, or the wearable device 1000 itself. In such an embodiment, there may be a database of recommendations that can be provided to the user based on their previous behaviors and activities. Recommendations may be provided to the user through hard-coded software logic, or through learnings obtained from the user's previous behaviors and activities.

In some embodiments of the present disclosure, image data (including video data) or audio data may be recorded and stored so that the user can refer to it later through the user-facing application 1100 or otherwise. In some embodiments of the present disclosure, various softwares, such as image recognition or voice recognition softwares may be used to label this data to provide a searchable record of the user's day to day activities that they may refer to later.

In some embodiments of the present disclosure, the user could manually label their activities through the user-facing application 1100 in order to correct any erroneous results that were labeled by the activity classification program 1202. In some embodiments of the present disclosure, these manual corrections may also be used to provide additional training data to the activity classification program 1202 in order to improve accuracy. In some embodiments of the present disclosure, various forms of federated learning may be employed in order to transfer these learnings from the user's local device(s) to a server side activity classification model without having to transfer the image data itself, in order to improve accuracy while maintaining an additional level of user privacy or security. In such an embodiment, the activity classification program 1202 may be employed locally as illustrated in FIG. 2, to avoid image data transfer to the cloud.

In some embodiments of the present disclosure, the user-facing application 1100 may not need to connect to the web server 1200, if all data processing tasks are completed locally on the user-facing application itself.

In some embodiments of the present disclosure, neither a web server 1200 or the user-facing application 1100 is needed to run the activity classification program 1202, which may be run directly on the wearable device 1000 itself. In such cases the user-facing application may not be necessary, or may just be used for device setup and/or configuration of device preferences and settings.

In some embodiments of the present disclosure, the wearable device 1000 provides sufficient means of interfacing with the user and communicating relevant activity information to the user (ie. through a heads up display or otherwise), in which case the user-facing application is not required at all.

Figure 10:
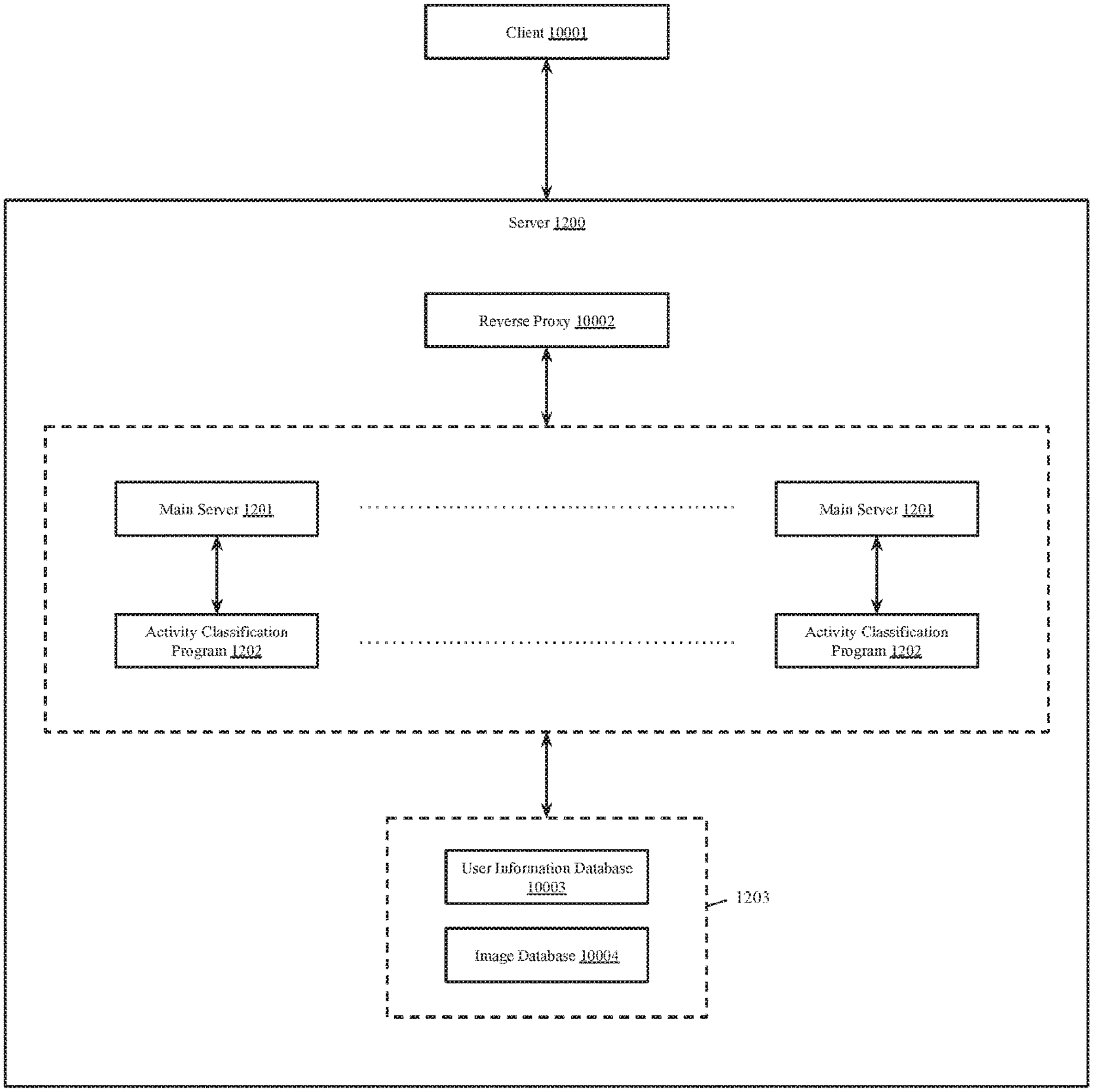
FIG. 10 depicts one potential configuration of the server-side application.

FIG. 10 is a diagram illustrating one potential embodiment of the server side architecture. In such an embodiment, a reverse proxy 10002 is used to route client traffic to one or more main server programs 1201, which may be run on separate threads within the same CPU, or separate CPUs altogether. These servers would save and load data to and from the user information database 10003 and the image database 10004 as necessary. These main server programs may also utilize the activity classification program 1202 in order to classify new sample data that was recently uploaded. The activity classification program may similarly be hosted on separate threads within the same CPU, or on separate CPUs altogether. Alternatively, if the processing time of the activity classification program 1202 is negligible, the program 1202 may be run synchronously on the same thread as the main server, although this is not preferable as it prevents the CPU from responding to other traffic while performing the data processing tasks in 1202.

Figure 11:
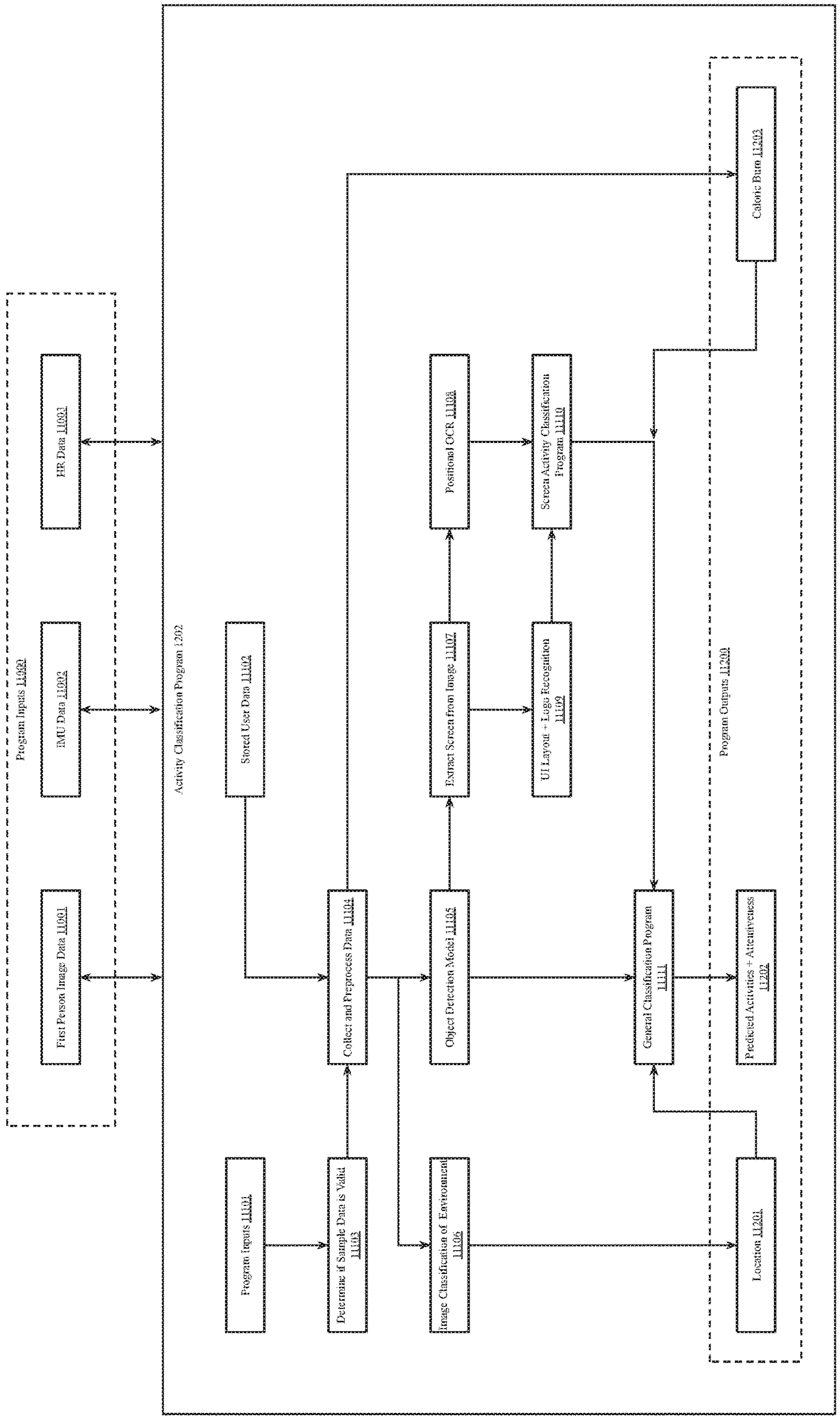
FIG. 11 depicts the machine learning architecture of the wearable device, according to some embodiments of the present disclosure.

FIG. 11 is a diagram illustrating an exemplary embodiment of the activity classification program 1202. Such a program is designed to be run on a server with an abundance of computational resources, however, it can be condensed to run on the user's personal computer and/or mobile device (as outlined in 2100), or even the wearable device 1000 itself. In ideal embodiments, the activity classification program 1202 requires three main inputs sampled by the wearable device 1000, first person image data 11001. IMU data 11002, and HR data 11003. The program inputs are first checked for validity in 11103. This is done by first checking to ensure that the timestamp that accompanies the sample data is a valid timestamp in the past, and that the timestamp is within a reasonable range from the present time (for instance, if the wearable device 1000 is programmed to only store data from the past week, then any data timestamped further than one week prior would be considered invalid). The IMU data 11002 and HR data 11003 are also checked to ensure that the readings are within a reasonable range (for instance, a heart rate of 500 may not be considered reasonable). If the program inputs are considered valid, they are then preprocessed in 11104. In this logic block 11104, stored user information may also be retrieved (ie. from the server database, local storage, or otherwise) to further supplement the activity classification program 1202. For instance, the user's height, weight, biological sex, and age would be used in conjunction with the HR data 11003 in order to estimate the user's caloric burn 11203 at the time of the sample. There are several existing models which utilize these parameters to estimate caloric burn. In 11104, the current IMU data sample 11002 may be combined with previously collected data samples to also estimate the user's number of steps taken, as well as their approximate distance traveled. These estimations may be used as additional program outputs. If a fisheye lens was used to capture first person image data, the fisheye effect would further be removed by one or more distortion operations applied to the image data in 11104. The preprocessed image data is then passed into two separate programs, an environment classification heuristic 11106, and an object detection model 11105. Such programs may either run synchronously or asynchronously. In the asynchronous case, the general classification program 11111 would wait until all of the required input parameters are ready. The environment classification heuristic 11106 is an image recognition heuristic that attempts to classify the user's general location and surroundings (ie. classroom, office space, living room, grocery store, etc.). While any image recognition heuristic may be used to classify the user's environment with sufficient training data, CNNs (Convolutional Neural Network) are preferred. Specifically, the CNN architectures AlexNet and ResNet have seen success in such an application. The top environment predictions are used as both an output of the overall model 11201, and are also vectorized and used as an input into the general classification program 11111. Similarly, the object detection model 11105 is also an image recognition heuristic, except it seeks to classify individual regions of the image containing relevant objects. The object detection model 11105 may be developed and trained locally, or it may be outsourced to a third-party API (such as Google Cloud Vision or Amazon Rekognition). If the object detection model 11105 is developed locally, it should be trained on all objects that are relevant to the general activities that the activity classification program 1202 seeks to classify. For instance, if writing/paperwork is one of the general activities that the program 1202 seeks to classify, then relevant objects might include a pen, pencil, paper, etc. While any object detection architecture may be used for a locally hosted model 11105, R-CNNs (Region-Based Convolutional Neural Network) are preferred. Specifically, the Fast R-CNN, Faster R-CNN, and YOLO architectures have seen success in such an application. If the object detection model 11105 is outsourced to a third-party API, the object outputs of the API should be filtered to avoid erroneous results as well as avoid overtraining of classifiers within the general classification program 11111. The object outputs of 11105 and their bounding boxes are then passed into the general classification program 11111. The bounding boxes or coordinates of the objects may be further processed to provide information regarding the relative size or position of the object in relation to the user, or the proximity of the object in relation to the user, which then may be additionally passed into the general classification program 11111. If either a computer or mobile device screen is detected from 11105, the image data 11001 along with the screen object coordinates are additionally passed into 11107. Processes 11107, 11108, 11109, and 11110 together attempt to further classify the user's activity by determining exactly what screen activity (ie. website or specific application) is taking place on the user's device. If the user-facing application 1100, or web browser extension is already running in the background and sampling the user's activities on their computer or mobile device, these processes may not be necessary. In process 11107, the image is first cropped using the screen object coordinates that were outputted from 11105. The cropped image is then further preprocessed using edge detection in order to more accurately obtain the bounds of the screen, and if valid bounds are found, the image is further cropped to those bounds. The cropped image then undergoes one or more distortion and transformation operations to correct the perspective of the screen, as the user might have been viewing their screen from an angle. The cropped and perspective corrected image is then passed into two separate programs, a positional OCR (Optical Character Recognition) model 11108 and a UI layout/logo recognition heuristic 11109. The positional OCR 11108 attempts to extract texts from the screen image, by searching locations on the screen where the most relevant data might be held. For instance, model 11108 will search for a top URL bar in case the user is using a web browser, and it may also search other relevant areas such as the top Apple menu bar if the user is using Mac OS (the menu bar typically displays text indicating which application is currently open). If relevant texts are found using 11108, they are outputted to the main screen activity classification program 11110. The UI layout/logo recognition heuristic 11109 attempts to apply further image recognition heuristics to extract relevant information from the screen image. In ideal embodiments, one or more image recognition classifiers are used to attempt to classify the screen image amongst common screen layouts that the model is trained on. For instance, the websites Google, Facebook and Instagram have distinctive UI layout characteristics that can be identified through image recognition. While any image recognition model may be used to classify UI layouts with sufficient training data, a CNN is preferred. Specifically, AlexNet, ResNet, VGG and other models have been used to successfully distinguish between UI layouts, although smaller CNN models may also be used to achieve similar accuracy. Alternatively, image matching models such as SIFT (Scale Invariant Feature Transform), SURF (Speeded Up Robust Features), and ORB (Oriented Fast and Rotated Brief) may be used to match the screen image against a database of existing UI layouts, although this becomes computationally expensive as the database grows. In addition to UI layout recognition, 11109 also attempts to search for common logos that are associated with certain applications, websites, or brands. Logo recognition is preferably accomplished by means of yet another object detection model, such as one of many R-CNN architectures. Alternatively, logo recognition can also be outsourced to a third-party API. The resultant UI layout classification as well as the detected logos from 11109, along with the relevant texts extracted from 11108, are then passed into the main screen activity classification program 11110. The main screen activity classification program 11110 first checks if a valid URL was obtained from the positional OCR 11108. If a valid URL was obtained, or a valid application name was found from the OCR 11108, the results are then cross checked with the UI layout and logo recognition results to ensure that the URL accurately depicts the user's current screen activity. The validated URL or application name is then outputted by the screen activity classification program 11110. If neither a valid URL or application name was obtained from the OCR 11108, the main screen activity classification program 11110 then vectorizes the results from the UI layout and logo recognition model 11109, and passes those results into classifier which is trained to recognize screen activities based on known layouts and/or logos. Such a classifier may be realized by any statistical, regression or classification model, including but not limited to machine learning heuristics such as SVM (Support Vector Machine), Decision Trees, KNN (K-Nearest Neighbors), and NNs (Neural Network). The usage of Decision Trees, KNNs, and NNs have seen success in terms of activity classification accuracy, although others may be used to achieve the same effect. The result of this classifier is then used as the output of the screen activity classification program 11110. The output of the screen activity classification program, which may be a URL, application name, or otherwise, is then passed into the general classification program 11111. The general classification program 11111 thus takes in the predicted environment of the user, the surrounding relevant objects of the user, the predicted screen activities (if applicable) of the user, and the current caloric burn of the user in order to make an accurate prediction as to the user's current general and screen activities. The general classification program 11111 uses simple logic statements in combination with one or more classifiers in order to convert these inputs into one or more predicted activities, as well as their attentiveness to each activity 11202. This classifier would be pre-trained on a large dataset of pre-labelled activity data. Such classifiers may be realized by any standard classification models, but machine learning heuristics such as SVM (Support Vector Machine), Decision Trees, KNN (K-Nearest Neighbors), and NNs (Neural Network) have seen success in such applications. The general classification program 11111 also utilizes logic to determine if an activity is indeterminate. This may be useful if erroneous or invalid image data was captured, or if the user's environment and/or surroundings are convoluted enough such that an accurate activity prediction would not be produced. For instance, this logic might check if an image is blank, or if there aren't enough objects in the image to produce an accurate prediction. In addition, if the probabilities associated with each object are relatively low, the activity may also be deemed indeterminate. Taken together, the user's location/environment 11201, the user's predicted activities and attentiveness to each activity 11202, and the user's caloric burn 11203 are used as the primary outputs of the activity classification program 1202. Note that in some embodiments of the present disclosure, only the user's current or predicted activities might be used as an output of the activity classification program 1202, as the other outputs are supplementary.

Figure 12:
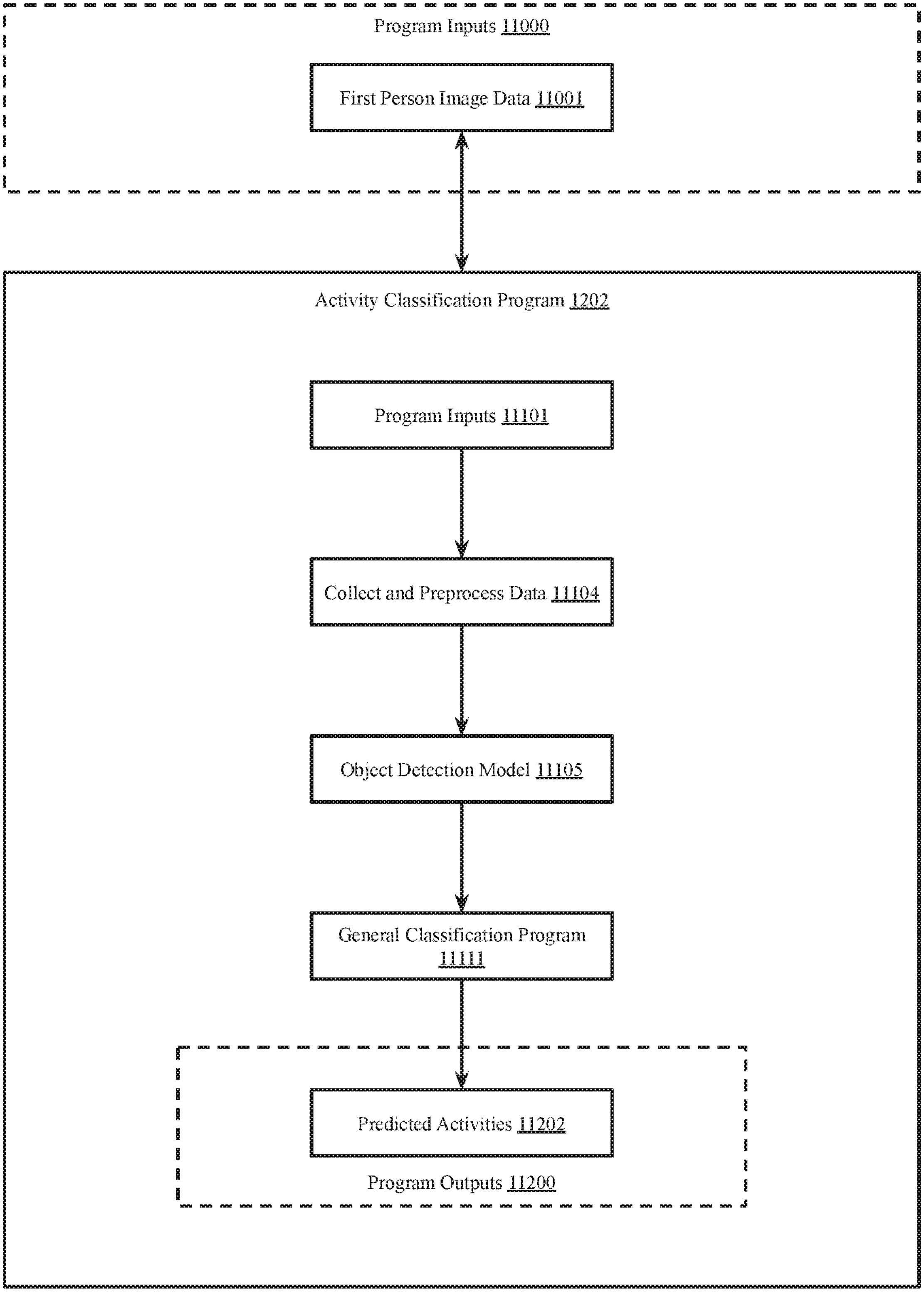
FIG. 12 depicts a condensed machine learning architecture of the wearable device, according to some embodiments of the present disclosure.

In some embodiments of the present disclosure, a condensed activity classification program 1202 may be implemented as illustrated in FIG. 12. Such an embodiment may be preferable in certain situations where simplicity and lower computational load are preferred. In such embodiments, the only program input is the first person image data

11001 captured by the wearable device 1000. This image data is then preprocessed as necessary in 11104 before being passed into an object recognition model 11105. Similar to the foregoing exemplary embodiment, the object detection model 11105 may be developed and trained locally, or it may be outsourced to a third-party API (such as Google Cloud Vision or Amazon Rekognition). If the object detection model 11105 is developed locally, it should be trained on all objects that are relevant to the general activities that the activity classification program 1202 seeks to classify. While any object detection architecture may be used for a locally hosted model 11105, R-CNNs (Region-Based Convolutional Neural Network) are preferred. Specifically, the Fast R-CNN, Faster R-CNN, and YOLO architectures have seen success in such an application. If the object detection model 11105 is outsourced to a third-party API, the object outputs of the API should be filtered to avoid erroneous results as well as avoid overtraining of classifiers within the general classification program 11111. The object outputs of 11105 and their bounding boxes are then passed into the general classification program 11111. The general classification program 11111 then takes the relevant object outputs of 11105 and their bounding boxes, vectorizes them, and passes them into a classifier within 11111. This classifier would be pre-trained on a large dataset of pre-labelled activity data. Such classifiers may be realized by any standard classification models, but machine learning heuristics such as SVM (Support Vector Machine), Decision Trees, KNN (K-Nearest Neighbors), and NNs (Neural Network) have seen success in such applications. The resultant activities predicted by this classifier would then be used as the main program output 11202.

In some embodiments of the present disclosure, the activity classification program 1202 may be condensed even further. In such an embodiment, the object detection model 11105 and general classification program 11111 outlined in FIG. 12 are replaced by a single image recognition model. While there are several image recognition models that may produce satisfactory outputs with sufficient training data, a CNN is preferred. The fully connected layers of the CNN would thus be trained to classify the user's activities 11202 directly. The disadvantage of such a model is that the CNN would require a substantially large dataset before convergence in training may be reached, and without more layers of logic and abstraction, such a model may not reach the same level of accuracy or precision that the models outlined in FIG. 11 or FIG. 12 would.

In some embodiments of the present disclosure, the activity classification program 1202 may process data samples through time, or process multiple data samples at once. An RNN (Recurrent Neural Network) or LSTM (Long Short Term Memory) network may be used to more accurately process data samples through time. Furthermore, image processing algorithms may receive and process a tensor or 5-dimensional structure of image samples (ie. corresponding to a video) in order to process activities through time. Other logic or heuristics may be used to process activities through time, or infer activities between samples.

In some embodiments of the present disclosure, IMU data, HR data, steps (derived from IMU data), or distance travelled (derived from IMU data) may be used as inputs into the general classification program 11111, either in addition to or instead of the calculated caloric burn data 11203.

In some embodiments of the present disclosures, the user may be able to label or correct mislabelled activities through the user-facing application 1100, which may be used to further train or improve the activity classification program 1202.

It would be obvious to those skilled in the art that modifications may be made to the embodiments described above without departing from the scope of the present invention. Plus the scope of the invention should be determined by the dependent claims in the formal application and their legal equivalents, rather than by the examples given.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

We claim:

1. A wearable device worn on a user's head comprising:
an image sensor oriented to capture the user's first person perspective;
local memory;
a Bluetooth Low Energy (BLE) wireless transmitter;
at least one microcontroller executing firmware configured to:
control capture of image data by the image sensor;
associate captured image data with timestamps prior to transmission;
store the timestamped image data in the local memory;
compress the stored image data to generate compressed image data; and
transmit the compressed image data and the associated timestamps via the BLE wireless transmitter to an external device;
wherein the external device is configured to provide information about the user's activities through a graphical user interface,
wherein the external device is configured to preprocess first person image data, extract notable objects from the image data using an object detection model, and then process details of the objects using a classification program which utilizes logic and machine learning heuristics to classify user activities.

2. The wearable device of claim 1, wherein the wearable device is configured to provide real time cues to the user through one of light or sound, and send notifications to a computing device of the user.

3. The wearable device of claim 1, wherein the wearable device circuitry is enclosed in an eyeglasses frame designed to accommodate prescription lenses.

4. The wearable device of claim 1, wherein the object detection is performed implicitly, such that data processing architecture associated with the wearable device comprises one or more computer vision networks that learn to recognize objects without requiring an explicit object detection step, said one or more computer vision networks including at least one of one or more convolutional neural networks, one or more recurrent neural networks, and one or more transformer networks.

5. A wearable device worn on a user's head comprising:
an image sensor oriented to capture the user's first person perspective;
local memory;
a Bluetooth Low Energy (BLE) wireless transmitter;
at least one microcontroller executing firmware configured to:
control capture of image data by the image sensor;
associate captured image data with timestamps prior to transmission;
store the timestamped image data in the local memory;
compress the stored image data to generate compressed image data; and
transmit the compressed image data and the associated timestamps via the BLE wireless transmitter to an external device;
wherein the external device is configured to provide information about the user's activities through a graphical user interface,
wherein the external device is configured to: upload image data to an external cloud server which preprocesses first person image data, extract notable objects from the image data using an object detection model, and process details of the objects using a classification program which utilizes logic and machine learning heuristics to classify user activities, then relay results of the classification back to the external device.

6. The wearable device of claim 5, wherein the wearable device is configured to provide real time cues to the user through light or sound, and send notifications to a computing device of the user.

7. The wearable device of claim 5, wherein the wearable device circuitry is enclosed in an eyeglasses frame designed to accommodate prescription lenses.

8. The wearable device of claim 5, wherein the object detection is performed implicitly, such that data processing architecture associated with the wearable device comprises one or more computer vision networks that learn to recognize objects without requiring an explicit object detection step, said one or more computer vision networks including at least one of one or more convolutional neural networks, one or more recurrent neural networks, and one or more transformer networks.

9. A method of using a wearable device comprising an image sensor, a BLE wireless transmitter, local memory, and a microcontroller, the method comprising:
controlling capture of image data by the image sensor from a first person perspective of a user, using firmware executed on the microcontroller;
associating the captured image data with timestamps prior to transmission;
storing the timestamped image data in the local memory of the wearable device;
compressing the stored image data, using the firmware, to generate compressed image data;
transmitting the compressed image data and the associated timestamps via the BLE wireless transmitter to an external device that is configured to provide information about the user's activities through a graphical user interface;
classifying the user's activities, at the external device, by preprocessing the image data, extracting notable objects from the image data using an object detection model, then processing the objects' details using a classification program which utilizes logic and machine learning; and
displaying relevant activity information to the user through the graphical user interface.

10. The method of claim 9, wherein the object detection is performed implicitly, such that data processing architecture associated with the wearable device comprises one or more computer vision networks that learn to recognize objects without requiring an explicit object detection step, said one or more computer vision networks including at least one of one or more convolutional neural networks, one or more recurrent neural networks, and one or more transformer networks.

* * * * *